United States Patent
Hwang et al.

(10) Patent No.: US 8,732,730 B2
(45) Date of Patent: May 20, 2014

(54) MANAGEMENT APPARATUS AND METHOD OF MANAGING DEVICE DRIVER OF MANAGEMENT APPARATUS

(75) Inventors: Tae-kyung Hwang, Seoul (KR);
Jung-soo Seo, Suwon-si (KR);
Sang-min Lee, Suwon-si (KR);
Deok-hee Boo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 13/158,033

(22) Filed: Jun. 10, 2011

(65) Prior Publication Data

US 2011/0307907 A1    Dec. 15, 2011

(30) Foreign Application Priority Data

Jun. 11, 2010  (KR) .................. 10-2010-0055295

(51) Int. Cl.
*G06F 13/00* (2006.01)

(52) U.S. Cl.
USPC .......................... 719/327; 717/174; 717/177

(58) Field of Classification Search
USPC .................................. 719/327; 717/174, 177
See application file for complete search history.

(56) References Cited

U.S. PATENT DOCUMENTS

| | | | | |
|---|---|---|---|---|
| 6,954,930 | B2* | 10/2005 | Drake et al. | 717/178 |
| 8,261,258 | B1* | 9/2012 | Jianu et al. | 717/174 |
| 2003/0202199 | A1* | 10/2003 | Carter et al. | 358/1.13 |
| 2004/0215754 | A1* | 10/2004 | Orleth et al. | 709/223 |
| 2007/0101342 | A1* | 5/2007 | Flegg et al. | 719/321 |
| 2007/0245358 | A1* | 10/2007 | Hattori et al. | 719/321 |
| 2009/0282402 | A1* | 11/2009 | Allocca et al. | 717/176 |
| 2010/0302589 | A1* | 12/2010 | Kobayashi | 358/1.15 |
| 2011/0102830 | A1* | 5/2011 | Naitoh | 358/1.15 |

FOREIGN PATENT DOCUMENTS

| | | |
|---|---|---|
| JP | 2004-213132 | 7/2004 |
| JP | 2006-277446 | 10/2006 |

* cited by examiner

*Primary Examiner* — Andy Ho
(74) *Attorney, Agent, or Firm* — Stanzione & Kim, LLP

(57) ABSTRACT

A management apparatus to manage a device driver using a device driver package or a device driver configuration package and a method of managing the device driver of the management apparatus are provided. The management apparatus and the method are to deploy at least one of a device driver package to install a device driver using the device driver or a common device driver corresponding to at least one image forming apparatus and a device driver configuration package to modify a configuration of an installed device driver.

29 Claims, 25 Drawing Sheets

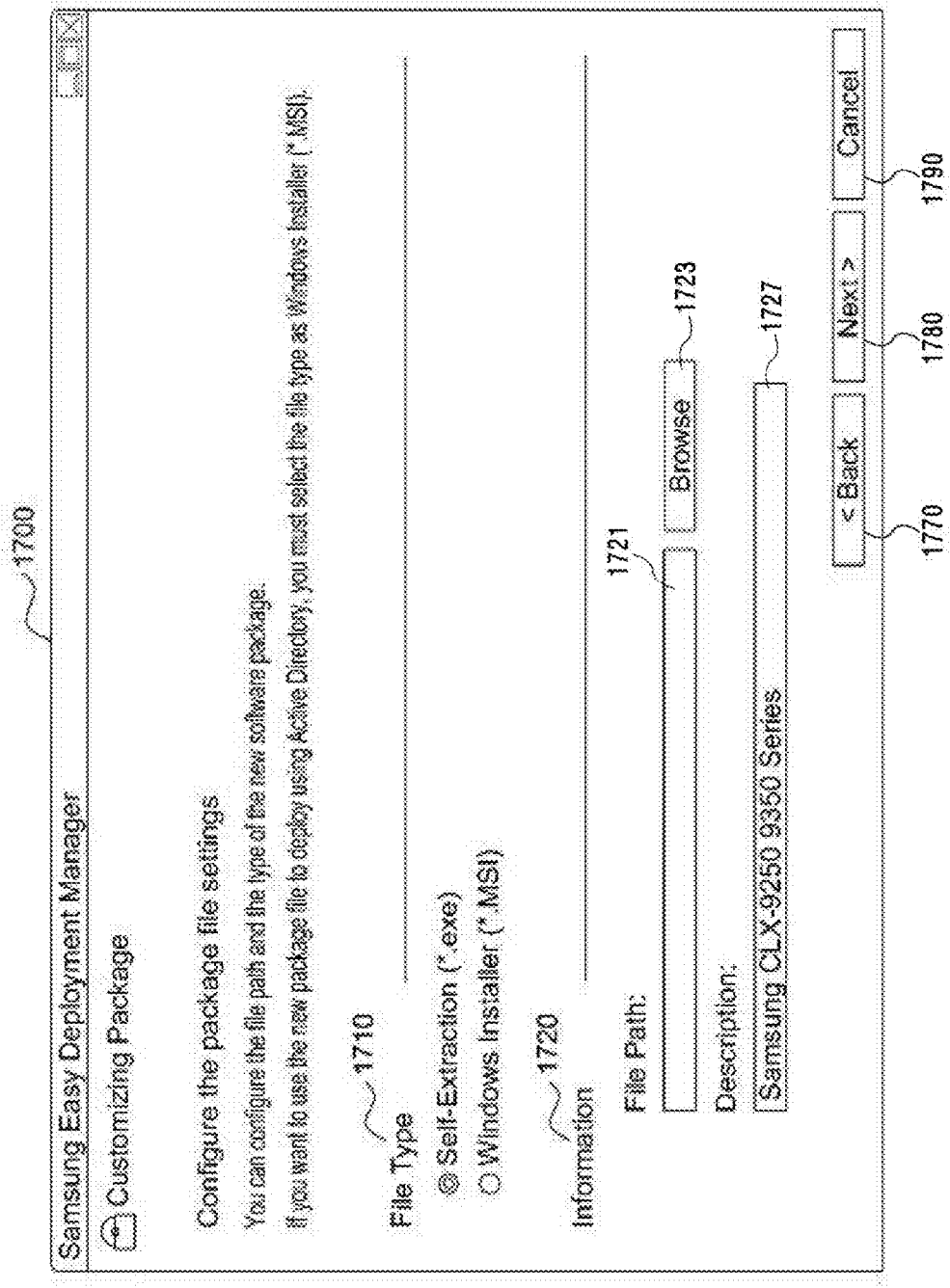

FIG. 18

Samsung Easy Deployment Manager

Customizing Package

Summary

This is a summary of the selected driver(s) and application(s).
Confirm the following information and click on "Next>".

| Items | Value |
|---|---|
| Package Path | D:¥Temp¥Samsung CLX-9250 9350 Series.exe |
| Descriptin | Samsung CLX-9250 9350 Series |
| Driver(s) | Samsung CLX-9250 9350 Series PRINTER DRIVER[Default Printer] |
| Application(s) | SMART PANEL |
| File Type | Self-Extract EXE |
| Port | 10.88.182.119 |
| MAC Address | 000F0A6D061 |
| Printer Name | SEC000F0A6D061 |
| Source Path | N:¥¥0. Bas¥Samsung CLX-9250 9350 Series.exe¥¥CD-Driver¥¥in |

[< Back] [Next >] [Cancel]

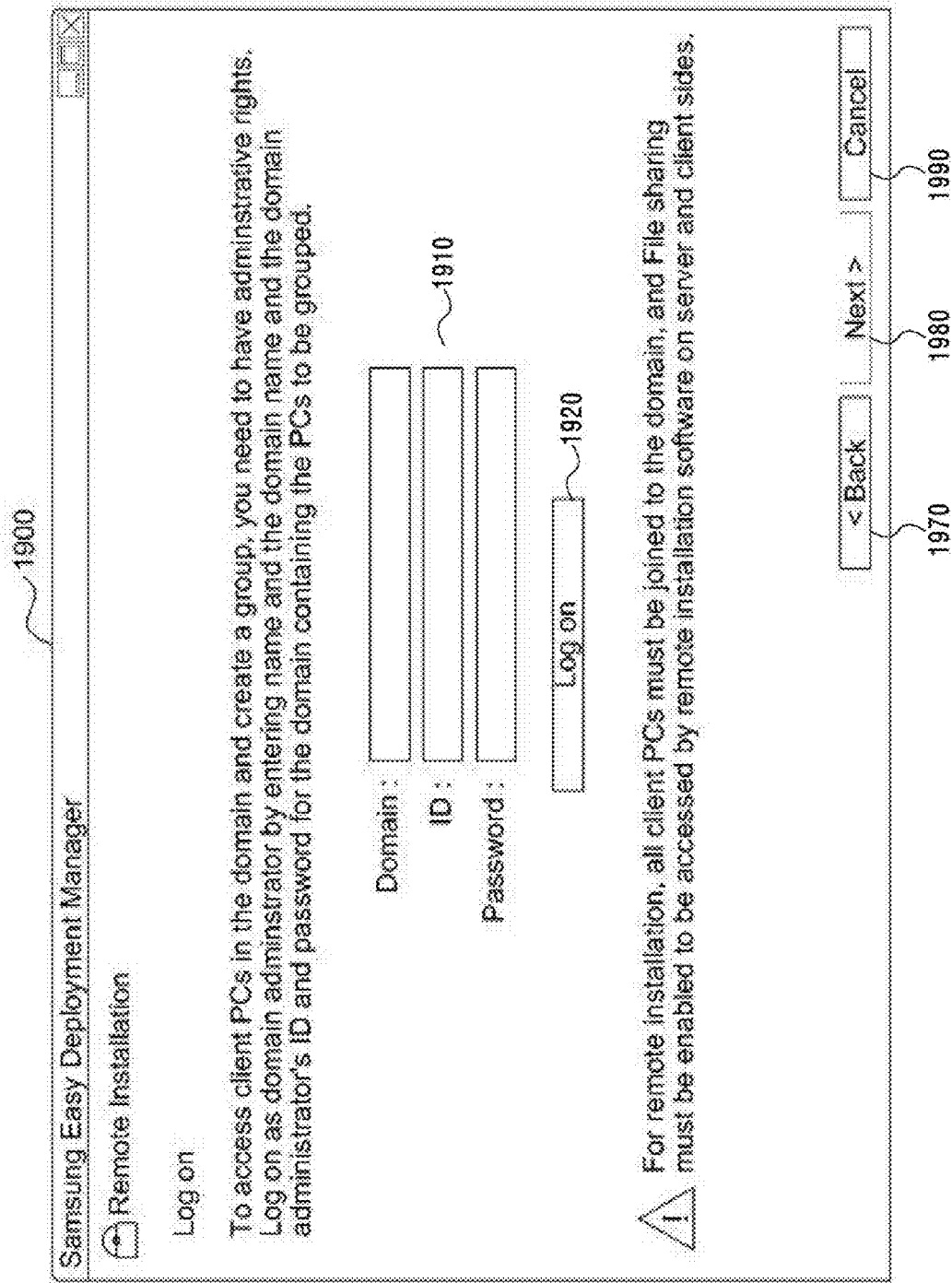

MANAGEMENT APPARATUS AND METHOD OF MANAGING DEVICE DRIVER OF MANAGEMENT APPARATUS

CROSS-REFERENCE TO RELATED APPLICATIONS

This application claims the benefit under 35 U.S.C. §119 from Korean Patent Application No. 10-2010-0055295, filed on Jun. 11, 2010, in the Korean Intellectual Property Office, the disclosure of which is incorporated herein by reference in its entirety.

BACKGROUND

1. Field of the Invention

The present general inventive concept generally relates to a management apparatus and a method of managing a device driver of the management apparatus.

2. Description of the Related Art

An image forming apparatus includes various types of devices such as a copier, a printer, a fax machine, a scanner, a multifunction peripheral (MFP), etc. Here, the MFP performs a plurality of functions among copying, printing, scanning, fax sending and/or receiving, e-mail sending and/or receiving, and file sending and/or receiving functions.

A device driver and an application are installed in a computer which is connected to the image forming apparatus through a wired and/or wireless network or a universal serial bus (USB) interface to control the image forming apparatus or perform at least one of functions supported by the image forming apparatus. Also, a solution is installed in a management apparatus to manage the image forming apparatus and the computer.

The device driver is software which is to control the image forming apparatus, and may, for example, include a printer driver, a scanner driver, a fax driver, or the like.

The application is software necessary for using the image forming apparatus, e.g., may include a smart panel, a smart-hru, a SetIP Utility, a personal computer (PC) fax utility, a direct printing utility, a scan manager, or the like. In other words, the application variously exists according to manufacturing companies or use purposes of the image forming apparatus.

The solution is installed in a server which is connected to the image forming apparatus and/or the computer in a wired and/or wireless network environment and is software which is to control and/or manage the connected image forming apparatus and/or computer. In other words, the solution variously exists according to manufacturing companies or use purposes of the image forming apparatus.

The device driver and the application variously exist according to a performance of the image forming apparatus, a function supported by the image forming apparatus, an operating system (OS) of the computer, or a performance of the computer.

Various types of device drivers, applications, or solutions have been developed due to high-quality specifications and diversities of image forming apparatus and computers. These device drivers, applications, or solutions are to be installed in computers or management apparatuses. A manufacturing company is to develop various types of device drivers, applications, or solutions, and a user or an administrator is to install the device drivers, applications, or solutions in a computer or a management apparatus to use an image forming apparatus. The number of installations and the number of upgrades of device drivers, applications, or solutions increase in proportion to the number of image forming apparatuses and the number of computers or management apparatuses.

SUMMARY OF THE INVENTION

The present general inventive concept provides a management apparatus and a method of managing a device driver of the management apparatus.

Additional embodiments of the present general inventive concept will be set forth in part in the description which follows and, in part, will be obvious from the description, or may be learned by practice of the general inventive concept.

The foregoing and/or other features and utilities of the present general inventive concept may be achieved by a method of managing a device driver of a management apparatus which is connectable to at least one image forming apparatus or at least one computer, the method including: selecting at least one device driver corresponding to the at least one image forming apparatus, generating a device driver package including the selected at least one device driver, device driver configuration information corresponding to the selected at least one device driver, and package configuration information, storing the generated device driver package, and deploying the stored device driver package in the at least one computer.

The device driver package may further include at least one of an application and a solution corresponding to the at least one image firming apparatus. At least one of the device driver configuration information and the package configuration information may correspond to the application or the solution.

The device driver configuration information may include setting of a lock/unlock mode corresponding to at least one function supported by the selected at least one device driver.

The device driver package may further include at least one of an installer to install the device driver in the at least one computer and a file extractor to extract a compressed file of the device driver package.

The package configuration information may include at least one piece of option information set in the device driver package.

The at least one piece of option information may include a determination as to whether a silent mode is applied to the at least one computer when installing the device driver package.

The deployment of the stored device driver package may include at least one of: deploying the device driver package in the at least one computer using a remote installation to transmit and install the device driver package to the at least one computer, and deploying the device driver package in the at least one computer using an active directory (AD) deployment to store and install the device driver package in an AD. The device driver package may be deployed as at least one of an executable (EXE) file and a Microsoft Installer (MSI) file.

The method may further include executing a device driver deployment manager in the management apparatus. The device driver deployment manager may include a package module to generate the device driver package, a deployment module to deploy the device driver package, and a driver configuration mode.

The method may further include providing history information corresponding to the device driver package. The history information may correspond to a generation or a deployment of another stored device driver package.

The method may further include receiving a log-on corresponding to an administrator account. The device driver package may be deployed using the administrator account.

The foregoing and/or other features and utilities of the present general inventive concept may also be achieved by a method of managing a device driver of a management apparatus which can be connected to at least one image forming apparatus or at least one computer, the method including: selecting at least one of at least one device driver and a common device driver corresponding to the at least one image forming apparatus, displaying a user interface (UI) screen corresponding to at least one function supported by at least one of the at least one device driver and the common device driver and receiving setting of a lock/unlock mode with respect to the at least one function on the displayed UI screen, generating a device driver configuration package including a device driver modification information execution file to execute a modification of a configuration of an installed device driver using device driver modification information including the setting of the lock/unlock mode and the device driver modification information, storing the generated device driver configuration package, and deploying the stored device driver configuration package in the at least one computer.

The device driver configuration package may further include a file extractor.

The foregoing and/or other features and utilities of the present general inventive concept may also be achieved by a management apparatus which is connectable to at least one image forming apparatus or at least one computer, including: a communication interface unit to be connected to the at least one image forming apparatus or the at least one computer, a storage unit to store at least one of at least one device driver or a common device driver corresponding to the at least one image forming apparatus, at least one device driver package, and at least one device driver configuration package, a device driver deployment manager to select one of the at least one device driver and the common device driver and generate and deploy at least one of the at least one device driver package and the at least one device driver configuration package corresponding to the selected at least one device driver or the selected common device driver, and a controller to control the device driver deployment manager to generate at least one of the device driver package and the device driver configuration package and deploy at least one of the device driver package and the device driver configuration package through the communication interface unit.

The management apparatus may further include a display unit to display a first UI screen to set at least one function supported by the selected at least one device driver and a second UI screen to generate at least one of the device driver package and the device driver configuration package.

The device driver package may include at least one device driver, and device driver configuration information and package configuration information corresponding to the at least one device driver.

The package configuration information may include at least one piece of option information set in the device driver package.

The device driver configuration package may include device driver modification information, which includes setting of a lock/unlock mode corresponding to at least one function supported by at least one of the device driver and the common device driver, and a device driver modification information execution file to execute a modification of a configuration of an installed device driver using the device driver modification information.

The device driver deployment manager may select at least one of an executable (EXE) file and Microsoft Installer (MSI) file in which the device driver package or the device driver configuration package is deployed.

The device driver deployment manager may support an edition function with respect to the device driver package or the device driver configuration package stored in the storage unit.

The device driver deployment manager may select at least one computer in which at least one of the device driver package and the device driver configuration package stored in the storage unit is deployed.

As described above, according to various exemplary embodiments, a management apparatus and a method of a managing a device driver of the management apparatus are to deploy at least one of a device driver package and a device driver configuration package using a device driver corresponding to at least one image forming apparatus or at least one computer.

The at least one of the device driver package and the device driver configuration package is also deployed using an application or a solution corresponding to the at least one image forming apparatus or the at least one computer.

BRIEF DESCRIPTION OF THE DRAWINGS

These and/or other embodiments of the present general inventive concept will become apparent and more readily appreciated from the following description of the embodiments, taken in conjunction with the accompanying drawings of which:

FIG. 17 is a view illustrating a UI screen which is to configure a package according to another exemplary embodiment;

FIG. 18 is a view illustrating a UI screen which is to display a summary of a package according to another exemplary embodiment;

FIG. 19 is a view illustrating a UI screen which is to log on to an administrator account according to another exemplary embodiment;

DETAILED DESCRIPTION OF THE EMBODIMENTS

Figure 1:
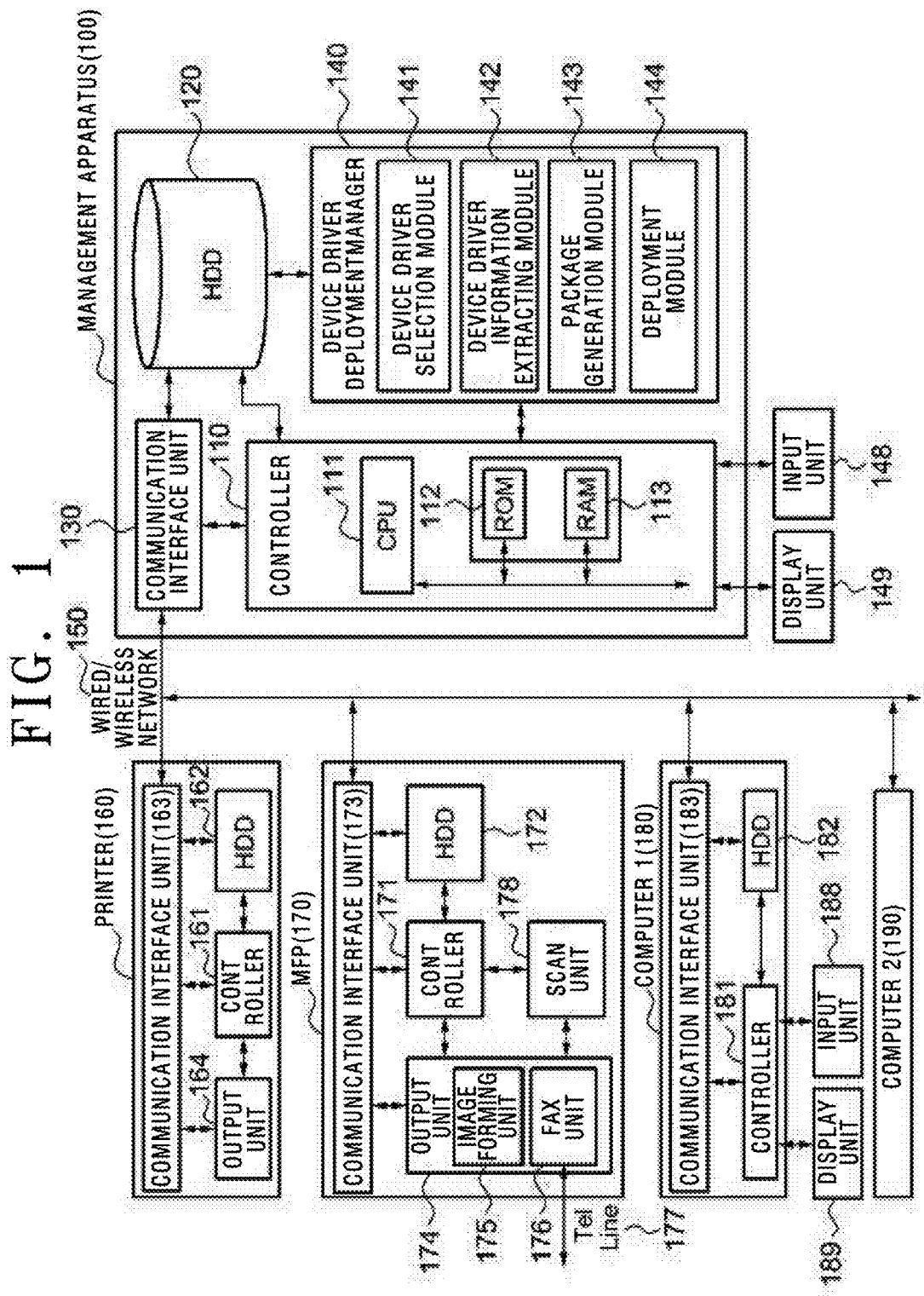
FIG. 1 is a block diagram illustrating an image forming apparatus, computers, and a management apparatus according to an exemplary embodiment.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

FIG. 1 is a block diagram illustrating an image forming apparatus, computers, and a management apparatus according to an exemplary embodiment.

Referring to FIG. 1, a management apparatus 100 according to the exemplary embodiment is connected to a wired/wireless network 150. The management apparatus 100 may perform universal serial bus (USB) communications using a USB interface (not shown). Thus, the management apparatus 100 may be configured to communicate with other devices via the USB interface.

The management apparatus 100 is connected to image forming apparatuses, such as a printer 160 and a multifunction peripheral (MFP) 170, etc., and/or one or more computers (e.g., first and second computers 180 and 190) through the wired/wireless network 150, the USB interface, or the like.

The management apparatus 100 which can be connected to the image forming apparatuses 160 and 170 or the first and second computers 180 and 190 in which a device driver is to be installed may include a management server (not shown). Also, software to deploy at least one device driver may be installed in the management apparatus 100.

The software to deploy the device driver may deploy the device driver in at least one computer or modify a configuration of the deployed device driver.

Here, the device driver may be deployed as a device driver package which includes the device driver, device driver configuration information corresponding to the configuration of the device driver, and package configuration information including package option information. If a configuration of an installed device driver is modified, the device driver may be deployed as a device driver configuration package which includes device driver modification information and a device driver execution file.

The management apparatus 100 includes a controller 110, a hard disk drive (HDD) 120, a communication interface unit 130, and a device driver deployment manager 140. An input unit 148 and a display unit 149 are connected to the management apparatus 100.

The controller 110 includes a central processing unit (CPU) 111, a read only memory (ROM) 112 which stores a control program, and a random access memory (RAM) 113 which stores input data or is used as a job-related storage area. The CPU 111, the ROM 112, and the RAM 113 are connected to one another through an internal bus. The controller 110 controls the HDD 120, the communication interface unit 130, the device driver deployment manager 140, the input unit 148, and the display unit 149.

A user input to operate the management apparatus 100 is input through the input unit 148 connected to the management apparatus 100. Examples of the input unit 148 include a keyboard (not shown), a mouse (not shown), a touch screen (not shown), and various types of hardware or software modules.

The display unit 149 is connected to the management apparatus 100 to display various functions supported by the management apparatus 100. For example, the display unit 149 may display status information and consumable supplies information of at least one image forming apparatus, status information of at least one computer, installation results of at least one package, a UI screen to generate at least one package of a device driver, a device driver package, and a device driver configuration package, and a user input, etc. input through the input unit 148.

The display unit 149 may be embodied using at least one of a cathode ray tube (CRT) monitor and a thin film transistor-liquid crystal display (TFT-LCD) monitor which display the above-described contents, and a touch screen which displays the above-described contents and receives inputs of a user by touch.

The display unit 149 may be constituted as an all-in-one system which is not detached from the management apparatus 100. Thus, in one example, the display unit 149 may be an integral part of the management apparatus 100.

The HDD 120 stores one or more of at least one device driver, a common device driver, at least one device driver package, and at least one device driver configuration package which correspond to one or more image forming apparatuses such as the printer 160 and the MFP 170 or the computers 180 and 190. The HDD 120 stores history information of another generated device driver package or another generated device driver configuration package. Therefore, information corresponding to a newly generated device driver package or a newly generated device driver configuration package may be added to the history information.

Image forming apparatuses such as the printer 160 and the MFP 170 may utilize the common device driver. The common device driver is a device driver which is commonly used in one type of image forming apparatuses. Examples of the common device driver include a common printer driver that can be commonly used in a plurality of printers, a common fax driver that can be commonly used in a plurality of fax machines, and a common scanner driver that can be commonly used in a plurality of scanners.

Here, a term "storage unit" used hereinafter may refer to the ROM 112, the RAM 113, or the HDD 120 of the controller 110.

The communication interface unit 130 is connected to the image forming apparatuses such as the printer 160 and the MFP 170 or the computers 180 and 190 through the wired/wireless network 150 or the USB interface.

Therefore, the management apparatus 100 executes a remote installation or an active directory (AD) deployment using the communication interface unit 130 to deploy at least one device driver package or at least one device driver configuration package in the computers 180 and 190 through the wired/wireless network 150 or the USB interface.

Also, the device driver package or the device driver configuration package which is to be deployed using the AD deployment may be deployed in the computers 180 and 190 included in an AD domain. The management apparatus 100 uploads the device driver package or the device driver configuration package to an AD server (not shown) included in the AD domain. The management apparatus 100 downloads and executes the uploaded device driver package or the uploaded device driver configuration package to the computers 180 and 190 included in the AD domain according to AD deployment information which is to be set.

The device driver package or the device driver configuration package may be uploaded to the computers 180 and 190 or a file server (not shown) included in the AD domain or may be downloaded and executed to the computers 180 and 190 included in the AD domain according to the AD deployment information.

The management apparatus 100 may store the device driver package or the device driver configuration package in a portable storage medium (e.g., a USB memory, a memory card, or the like). Thereafter, the management apparatus 100 may connect the portable storage medium to at least one computer to deploy the device driver package or the device driver configuration package in the computer.

The management apparatus 100 receives modification results of an installed device driver through the communication interface 130. Here, the modification results of the installed device driver correspond to the installation results of the device driver included in the device driver package or the device driver modification information included in the device driver configuration package, wherein the device driver package or the device driver configuration package is deployed in the computers including the first computer 180 and the second computer 190.

The device driver deployment manager 140 includes a device driver selection module 141, a device driver information extracting module 142, a package generation module 143, and a deployment module 144.

The device driver selection module 141 receives a selection of at least one device driver, which is to be generated as a package, from an administrator or a user. The device driver selection module 141 may receive a selection of at least one application or at least one solution.

A selected device driver, application, or solution may be stored in at least one of a storage unit of the management apparatus 100, an optical disk drive (not shown), such as a compact disk-read only memory (CD-ROM) (not shown) or a digital versatile disk-ROM (DVD-ROM) (not shown), a (portable) storage medium that can be connected to the management apparatus 100, a computer that can be connected to the wired/wireless network 150, a web server, and the image forming apparatuses such as the printer 160 and the MFP 170.

Also, another stored device driver package or another stored device driver configuration package may be selected. Here, the selected device driver package or the selected device driver configuration package may be edited and modified.

The device driver information extracting module 142 extracts device driver data corresponding to the selected device driver. For example, the device driver data may include a device driver installation file such as a setup information file (Inf file), a type of a device driver (e.g., a printer driver, a scanner driver, a fax machine driver, or the like), a name of the device driver (e.g., Samsung CLX-1000 Series, Samsung ML-3000 Series, or the like), a type and a file name of a file configuring the device driver, information on a manufacturing company providing the device driver, or information (e.g., a hardware ID, a USB Vendor ID (VID), or a USB product ID (PID)) on an image forming apparatus supported by the device driver.

If an application or a solution is selected, corresponding application data or corresponding solution data is extracted. Also, if the device driver and the application are selected together, extracted device driver data and extracted application data are discriminatively stored.

If a device driver package is selected, the device driver information extracting module 142 unpacks the selected device driver package and extracts corresponding device driver data.

The package generation module 143 generates a device driver package which includes device driver configuration information and package configuration information corresponding to the device driver data extracted by the device driver information extracting module 142. The package generation module 143 may generate a device driver configuration package which includes device driver modification information and a device driver modification information execution file. Here, the device driver modification information is used to modify a configuration of a device driver installed in at least one computer, and the device driver modification information execution file is used to execute and modify the configuration of the installed device driver using the device driver modification information.

An extension of the generated device driver package or the generated device driver configuration package may be selected as at least one of an executable (EXE) file and a Microsoft Installer (MSI) file. The generation of the package will be described later in more detail with reference to FIG. 2.

The deployment module 144 deploys the device driver package or the device driver configuration package, which is generated by the package generation module 143, outside the management apparatus 100. In other words, the deployment module 144 executes at least one of a remote installation and an AD deployment to deploy the generated device driver package or the generated device driver configuration package in at least one computer. Here, the remote installation is used to transmit at least one of the generated device driver package or the generated device driver configuration package to the at least one computer, and the AD deployment uses an AD installed outside the management apparatus 100. The deployment method may be selected.

The printer 160 includes a controller 161, a HDD 162, a communication interface unit 163, and an output unit 164.

The printer 160 is connected to the management apparatus 100 and the wired/wireless network 150 or the USB interface through the communication interface unit 163. The printer 160 receives a search request corresponding a device driver package generation of the management apparatus 100 or a transmission request for device information through the communication interface unit 163 and responds to the search request or the transmission request under control of the controller 161.

The HDD 162 stores the device information corresponding to the printer 160. The device information refers to information set in the printer 160, and may include, for example, at least one of a model name, a device name, a device ID, an IP address, a recording medium, and output counter information. The corresponding device information is transmitted to the management apparatus 100 according to the transmission request for the device information corresponding to the device driver package generation of the management apparatus 100.

Here, the HDD 162, or a ROM (not shown) or a RAM (not shown) of the controller 160 may be used as a storage unit.

The output unit 164 outputs printing data that may include at least one of color data and monochrome (e.g. black and white) data. The printing data may be received from the computers 180 and 190 or the management apparatus 100 via the wired/wireless network 150 or the USB interface. The printing data is controlled by the controller 161 and is output from the output unit 164. Alternatively, the printing data may be image-processed by an image processor (not shown) and then output from the output unit 164.

The output unit 164 may include a laser beam printer (LBP), an inkjet printer, or a thermal transfer printer according to a printing method.

The MFP 170 includes a controller 171, a HDD 172, a communication interface unit 173, an output unit 174 including an image forming unit 175 and a fax unit 176, and a scan unit 178.

The communication interface unit 173 is connected to the management apparatus 100 and the wired/wireless network 150 or the USB interface. The management apparatus 100 receives the search request corresponding to the device driver package generation or the transmission request for the device information through the communication interface unit 173 and responds to the search request or the transmission request under control of the controller 161.

The HDD 172 stores the device information corresponding to the MFP 170. The device information refers to information set in the MFP 170, e.g., includes at least one of a model name, a device name, a device ID, an IP address, a recording medium, and output counter information. Corresponding device information is transmitted to the management apparatus 100 according to the transmission request for the device information corresponding to the device driver package generation of the management apparatus 100. The HDD 172 also stores the output counter information corresponding to an output of the output unit 174 including the image forming unit 175 and the fax unit 176. In other words, if the output of the output unit 174 is generated, output information, which corresponds to the image forming unit 175 or the fax unit 176 and is stored in the HDD 172, is upgraded. In other words, a printing counter or a fax counter is upgraded.

Here, the HDD 172, or a ROM (not shown) or a RAM (not shown) of the controller 171 may be used as a storage unit.

The output unit 174 including the image forming unit 175 and the fax unit 176 outputs the printing data received from the computers 180 and 190 or the management apparatus 100. The output unit 174 transmits fax data scanned by the scan unit 178 to another fax machine (not shown) using the fax unit 176 via a telephone line 177 connected to the fax unit 176 under control of the controller 171.

A document scanned by the scan unit 178 may be copied by the image forming unit 175. The received printing data is controlled by the controller 171 to be output from the image forming unit 175 or may be image-processed by an image processor (not shown) and then output from the output unit 175.

Scan data scanned by the scan unit 178 is added and sent by an e-mail or sent as a file according to a performance of the MFP 170.

The first computer 180 includes a controller 181, a HDD 182, and a communication interface unit 183 and is connected to an input unit 188 and a display unit 189.

The communication interface unit 183 is connected to the image forming apparatus (e.g. the printer 160 or the MFP 170) or the management apparatus 100 and the wired/wireless network 150 or the USB interface. For example, the communication interface unit 183 communicates with the image forming apparatus or the management apparatus 100 through the wired/wireless network 150 or the USB interface. The first computer 180 receives the search request or an OS information request of the management apparatus 100 through the communication interface unit 183 and transmits information corresponding to the management apparatus 100 under control of the controller 181.

The HDD 182 stores an output target document output through the image forming apparatus (e.g. the printer 160 or the MFP 170). At least one device driver corresponding to the image forming apparatus (e.g. the printer 160 or the MFP 170) is installed in the HDD 182.

A printer driver corresponding to the printer 160 may be installed, and a scanner driver or a fax driver corresponding to the MFP 170 may be installed.

At least one application corresponding to the printer 160 and the MFP 170 may be installed. A solution may also be installed.

Device information of the first computer 180 is also stored in the HDD 182. The device information refers to information corresponding to at least one of a device driver, a common device driver, a device driver package, and a device driver configuration package, e.g., includes OS information, hardware information, etc.

Accordingly, if the management apparatus 100 requests the device information, the device information is transmitted to the management apparatus 100 under control of the controller 181.

The controller 181 receives a command to output the output target document stored in the HDD 182 or a newly written document on a user interface (UI) screen of a document output application (e.g., a word processor or the like) displayed on the display unit 189. The controller 181 also converts the output target document or the newly written document into printing data, which can be printed on a printing medium or output to output data by the image forming apparatus (e.g. the printer 160 or the MFP 170), through the installed device driver and transmits the printing data through the communication interface unit 183.

The installed device driver corresponds to an image forming apparatus which is to output a printing target document. Therefore, if an image forming apparatus not corresponding to the installed device driver is selected to perform printing, an error may occur.

The second computer 190 may be equally or similarly applied to the contents described in the first computer 180.

Figure 2:
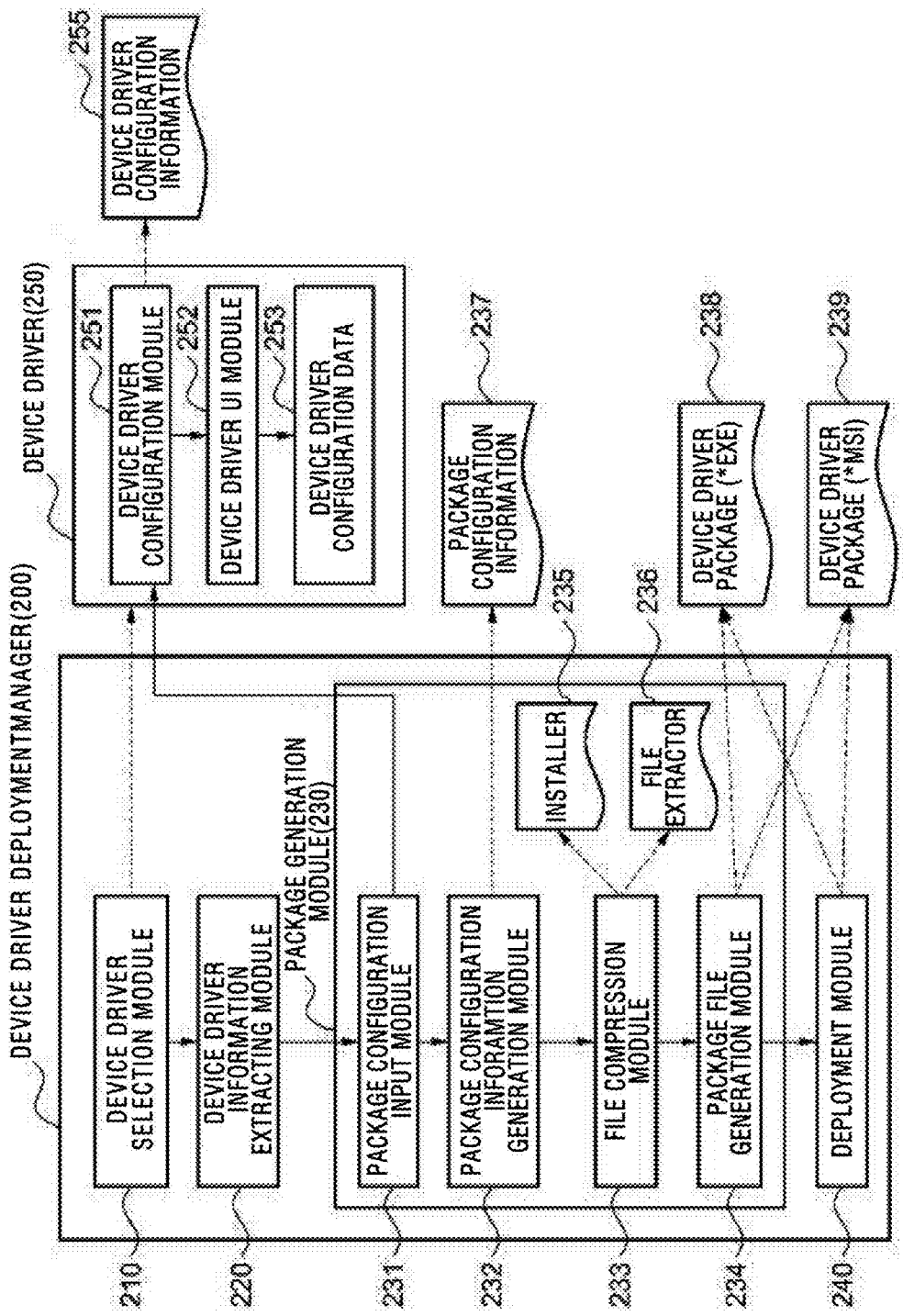
FIG. 2 is a block diagram illustrating a device driver deployment manager and a device driver of a management apparatus according to an exemplary embodiment.

FIG. 2 is a block diagram illustrating a device driver deployment manager 200 and a device driver 250 of a management apparatus according to an exemplary embodiment.

FIG. 2 illustrates the device driver deployment manager 140 of the management 100 of FIG. 1 and the device driver stored in the HDD 120 of the management apparatus 100 of FIG. 1 in more detail, according to an exemplary embodiment. Thus, the device driver deployment manager 200 of FIG. 2 may be equivalent to the device driver deployment manager 140 of FIG. 1.

Referring to FIG. 2, a device driver deployment manager 200 includes a device driver selection module 210, a device driver information extracting module 220, a package generation module 230, and a deployment module 240, which may be equivalent to the device driver selection module 141, the device driver information extracting module 142, the package generation module 143, and the deployment module 144 of FIG. 1, respectively. The package generation module 230 includes a package configuration input module 231, a package configuration information generation module 232, a file compression module 233, a package file generation module 234, an installer 235, and a file extractor 236.

At least one device driver 250 stored in the HDD 120 includes a device driver configuration module 251, a device driver UI module 252, and device driver configuration data 253.

The device driver selection module 210 receives a selection of at least one device driver, which is to be generated as a package, from an administrator or a user. The device driver selection module 210 also receives a selection of at least one application or at least one solution. The device driver selection module 210 may select the device driver and the application altogether.

The device driver selection module 210 may select another generated device driver package or another generated device driver configuration package.

The device driver, the application, the solution, the device driver package, or the device driver configuration package may be stored in a storage unit of the management apparatus 100, an optical disk drive (not shown), such as a CD-ROM (not shown) or a DVD-ROM (not shown), a portable storage medium that can be connected to the management apparatus 100, a computer that can be connected to the wired/wireless network 150, a web server, or the like. The device driver, the application, the solution, the device driver package, or the device driver configuration package may be stored in the image forming apparatus (e.g. the printer 160 or the MFP 170).

If another stored device driver package or another stored device driver configuration package is selected, this selected stored device driver package or this selected stored device driver configuration package may be edited in the device driver deployment manager 200.

The device driver information extracting module 220 extracts device driver data corresponding to the device driver selected for the generation of the package. The device driver data may include a device driver installation file, a type and a name of the device driver, a type and a file name of a file configuring the device driver, information on a manufacturing company providing the device driver, information of an image forming apparatus supported by the device driver, etc.

If the application or the solution is selected, corresponding application data or corresponding solution data is extracted. If the device driver and the application are selected together, the device driver data and the application data are discriminatively extracted.

If the device driver package is selected, the device driver information extracting module 220 unpacks the selected device driver package and extracts corresponding device driver data.

The device driver information extracting module 220 determines whether the selected device driver is a device driver capable of setting a lock/unlock mode with respect to at least one function supported by the device driver. In other words, if the device driver 250 includes the device driver configuration module 251, the device driver UI module 252, or the device driver configuration data 253, the device driver information extracting module 220 determines the device driver 250 as the device driver that supports the lock/unlock mode.

The lock/unlock mode is used to lock or unlock at least one function supported by a device driver on a UI screen related to the device driver.

For example, when at least one of a device driver package or a device driver configuration package is generated, one of color printing and monochrome (e.g. black and white) printing may be selected and set on a UI screen of a printer driver of a printer capable of performing color printing.

If the mono (monochrome) printing is selected, the color printing is limited and only the mono printing is possible in the corresponding printer. Also, in relation to saving of resources, N-UP printing (e.g., N≥2) and toner saving printing may be set, wherein the N-UP printing is used to enable a plurality of printing pages to be printed on a side of a recording medium, and the toner saving printing is used to perform printing that saves toner (e.g. saving more toner than a normal printing). According to setting of the lock/unlock mode, the corresponding printer applies the N-UP printing and the toner saving printing but restrains the uses of normal one page printing and generation of printing to which toner saving is not applied.

If a function supported by the device driver has a plurality of pieces of option information, the lock/unlock mode may lock one piece of option information or its corresponding function. For example, the lock/unlock mode may lock a duplex printing function in a printer that supports duplex printing or a fax function in a MFP that has a fax function. The lock/unlock mode may be set respectively with respect to one or more functions supported by the device driver.

The package generation module 230 includes the package configuration input module 231, the package configuration information generation module 232, the file compression module 233, and the package file generation module 234. The package generation module 230 further includes the installer 235 and the file extractor 236.

The package configuration input module 231 sets or modifies and stores a configuration of the device driver using the device driver information of the device driver configuration module 251 extracted by the device driver information extracting module 220.

The configuration or the modification of the device driver includes setting a lock/unlock mode on a UI screen of the corresponding device driver.

The result of the configuration or the modification of the device driver is stored as device driver configuration information 255 in a HDD.

The package configuration input module 231 stores at least one of a modification of device driver setting information to be installed and package properties, as package configuration information 237.

The device driver setting information may include an instance name of a generated device driver, a determination as to whether the device driver is shared, a share name if it is determined that the device driver is shared, an installation of an installed device driver as a default printer of a corresponding computer, etc. The device driver setting information may be modified according to a function supported by the device driver or a performance of the device driver.

The package properties may include image forming apparatus information (e.g., an IP address, etc.) which is to be used by the generated device driver package. If a device driver to be generated as a package includes at least one device driver and at least one application, the package properties may include selection information for selecting a device driver and an application included in the package, installation information of the device driver (e.g., Inf File, a driver name, etc.), configuration information of the application, or the like. The package properties may include most information extracted by the device driver information extracting module 220.

If the storage of the package configuration information 237 is completed, the package configuration information 237 is compressed using the file compression module 233. In other words, the file compression module 233 compresses the device driver configuration information 255, the package configuration information 237, the device driver, the application, the solution, the installer 235 that installs the device driver, the application, or the solution, the device driver configuration information 255 and the package configuration information 237 that may be compressed when the device driver package is executed in at least one computer, and the file extractor 236 that extracts the device driver, the application, or the solution into one package.

If a designation installer installing a device driver is included in a location designated by an administrator or a user, the designation installer is used. Therefore, the device driver package may be compressed without including an installer.

The package file generation module 234 stores the device driver configuration information 255, the package configuration information 237, the device driver, the application, the solution, the installer 235, and the file extractor 236, which are compressed by the file compression module 233, as one device driver package file in the HDD 120. A file extension of the stored device driver package file is set by the package configuration input module 231 and then is included in the package configuration information 237.

If the file extension of the device driver package file is an EXE file, the device driver package file is stored as a device driver package file 238 having an EXE format. If the file extension is an MSI file, the device driver package file is stored as a device driver package file 239 having an MSI format.

A generated device driver package file may be fixed to one file extension, and the device driver package file may be stored with the fixed file extension.

The deployment module 240 deploys the device driver package generated by the package generation module 230 outside the management apparatus 100. In other words, the deployment module 240 may execute at least one of a remote installation and an AD deployment to deploy the generated device driver package in at least one computer, wherein the remote installation is to transmit and install the generated device driver package to the computer, and the AD deployment uses an AD that is installed outside the management apparatus 100. Here, the deployment method may be selected by the administrator or the user.

Also, the deployment module 240 may store the device driver package in a separate storage medium such as a portable storage medium and then connect the storage medium to at least one computer to deploy the device driver package in the computer.

If at least one of computers is a server, the server may support an AD. Therefore, at least one device driver package which is to be deployed in an AD may be deployed in the server. Also, at least one device driver package or at least one device driver configuration package stored in the AD may be downloaded to at least one computer according to AD deployment information.

The AD deployment information is data necessary for an AD deployment, and may include, for example, a group policy name, a device driver package name, an organization unit to deploy a device driver package, a name of a common folder to which the device driver package is uploaded, group policy option information, etc.

Also, the generated device driver package may be deployed through a web, various deployment policies, or various deployment systems.

Figure 3:
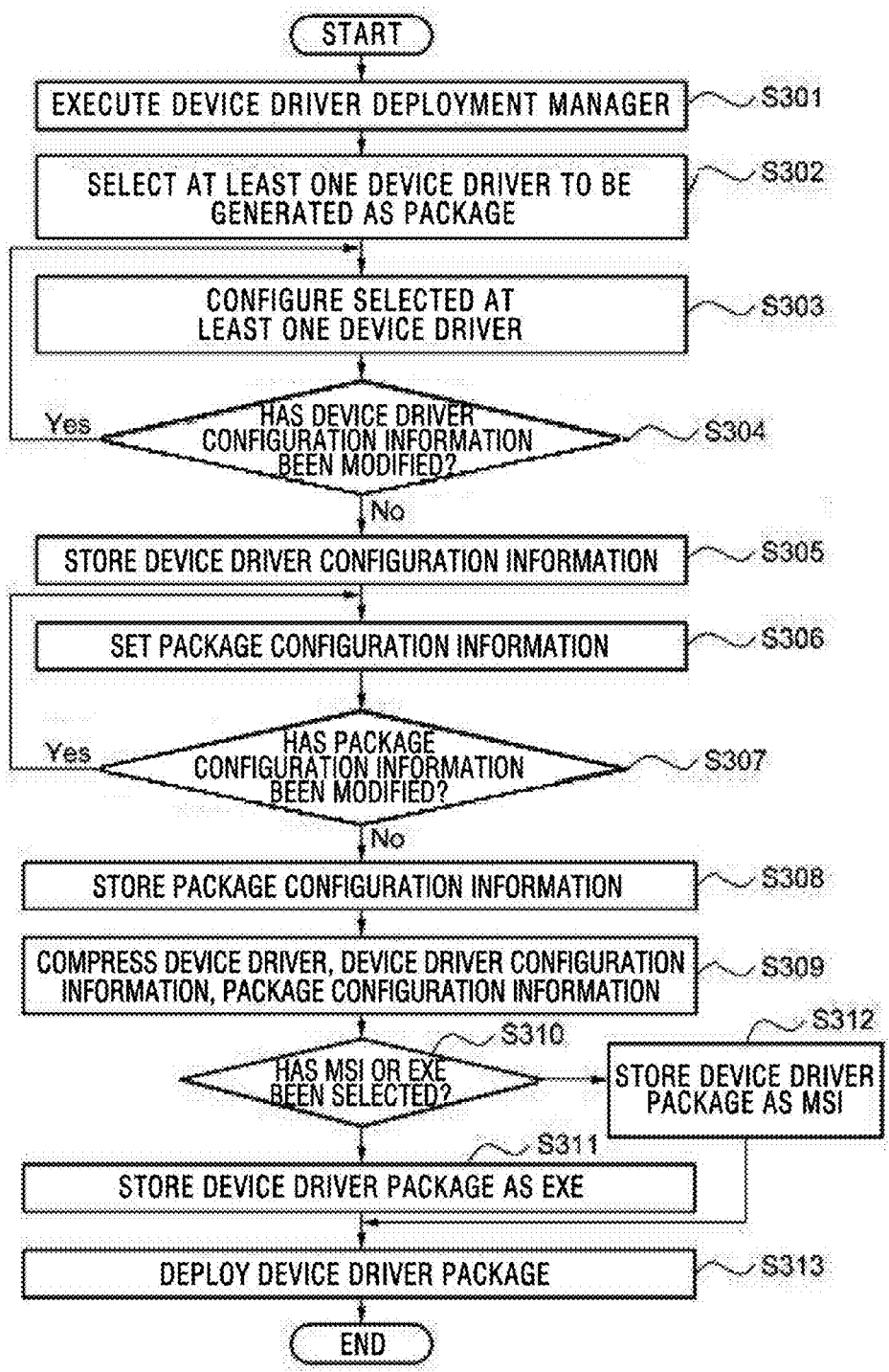
FIG. 3 is a flowchart illustrating a method of managing a device driver of a management apparatus according to an exemplary embodiment.

FIG. 3 is a flowchart illustrating a method of managing a device driver of a management apparatus according to an exemplary embodiment.

Referring to FIG. 3, a device driver deployment manager of the management apparatus 100 is executed using the input unit 148 and the display unit 149 at operation S301. By way of an example, the device driver deployment manager may be presented on the display unit 149 as a user interface, as shown in FIG. 9.

Figure 9:
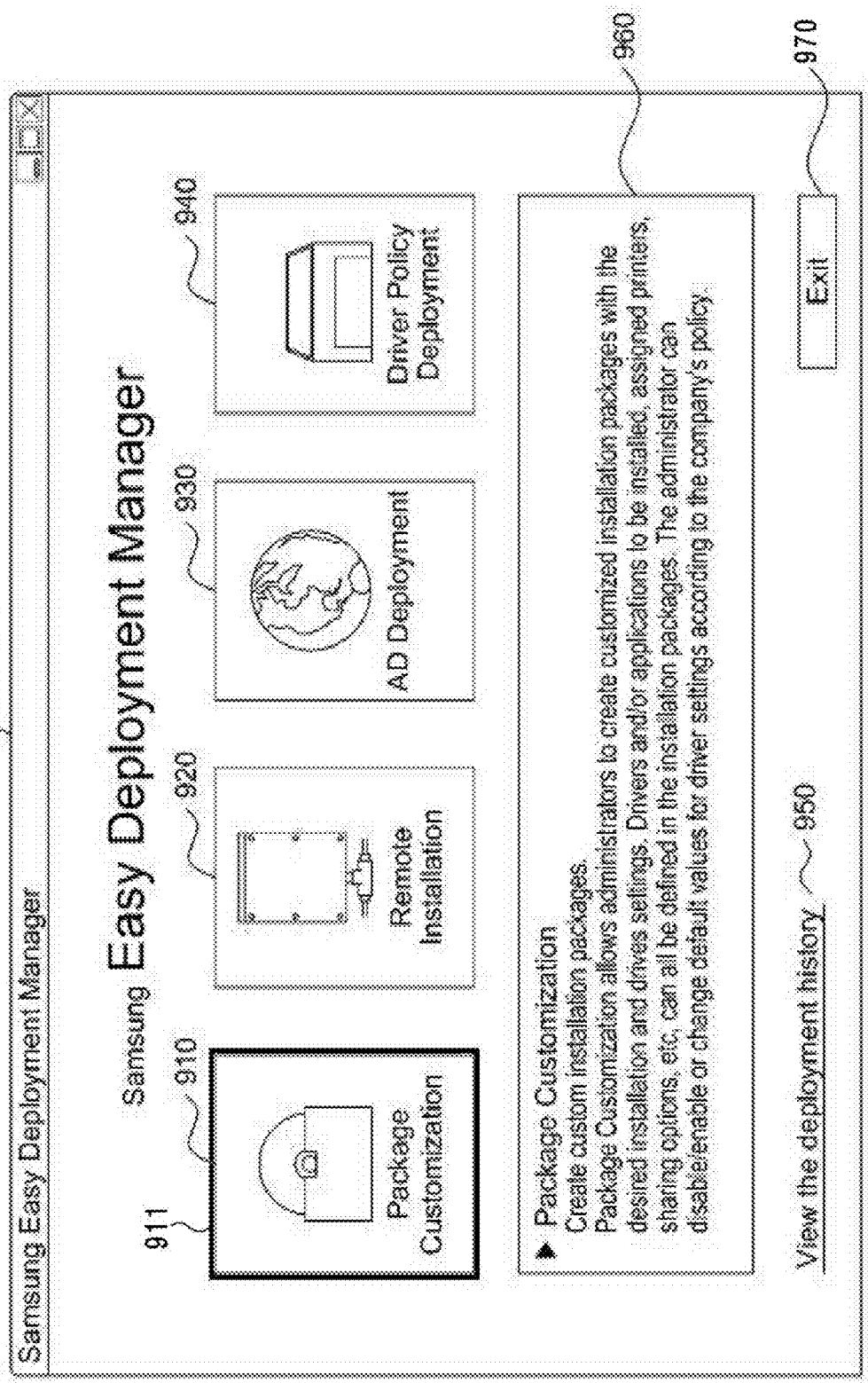
FIG. 9 is a view illustrating an initial user interface (UI) screen of a device driver deployment manager according to an exemplary embodiment.

FIG. 9 is a view illustrating an initial UI screen 900 of an executed device driver deployment manager according to an exemplary embodiment.

The executed device driver deployment manager includes a package customization mode 910, a remote installation 920, an AD deployment 930, and a driver configuration mode 940. Here, the package customization mode 910 is utilized to generate a device driver package, and the remote installation 920 is utilized to directly transmit and install the generated device driver package to at least one target computer. Also, the AD deployment 930 is utilized to use an AD, and the driver configuration mode 940 is utilized to modify a configuration of an installed device driver.

A deployment mode to deploy the generated device driver package outside the management apparatus 100 may include at least one of the remote installation 920 and the AD deployment 930.

The executed device driver deployment manager further includes a history information view option 950 which can be selected to display history information of other generated device driver packages and a description area 960 which provides descriptions of the modes 910 through 940. The description area 960 may provide descriptions of a selected mode. In this example, the package customization mode 910 is selected (shown by a selection box 911 around the customization mode 910), and thus the description area 960 provides description about the package customization. Also, the exit option 970 can be selected to exit out of the device driver deployment manager.

Referring back to FIG. 3, at least one device driver which is to be generated as a package is selected at operation S302. By way of an example, referring to FIG. 9, the package customization mode 910 is selected on the executed device driver deployment manager in the initial UI screen 900, and then at least one device driver which is to be generated as a package may be selected on a UI screen corresponding to the package customization mode 910, as shown in FIGS. 10 through 12, for example.

Figure 10:
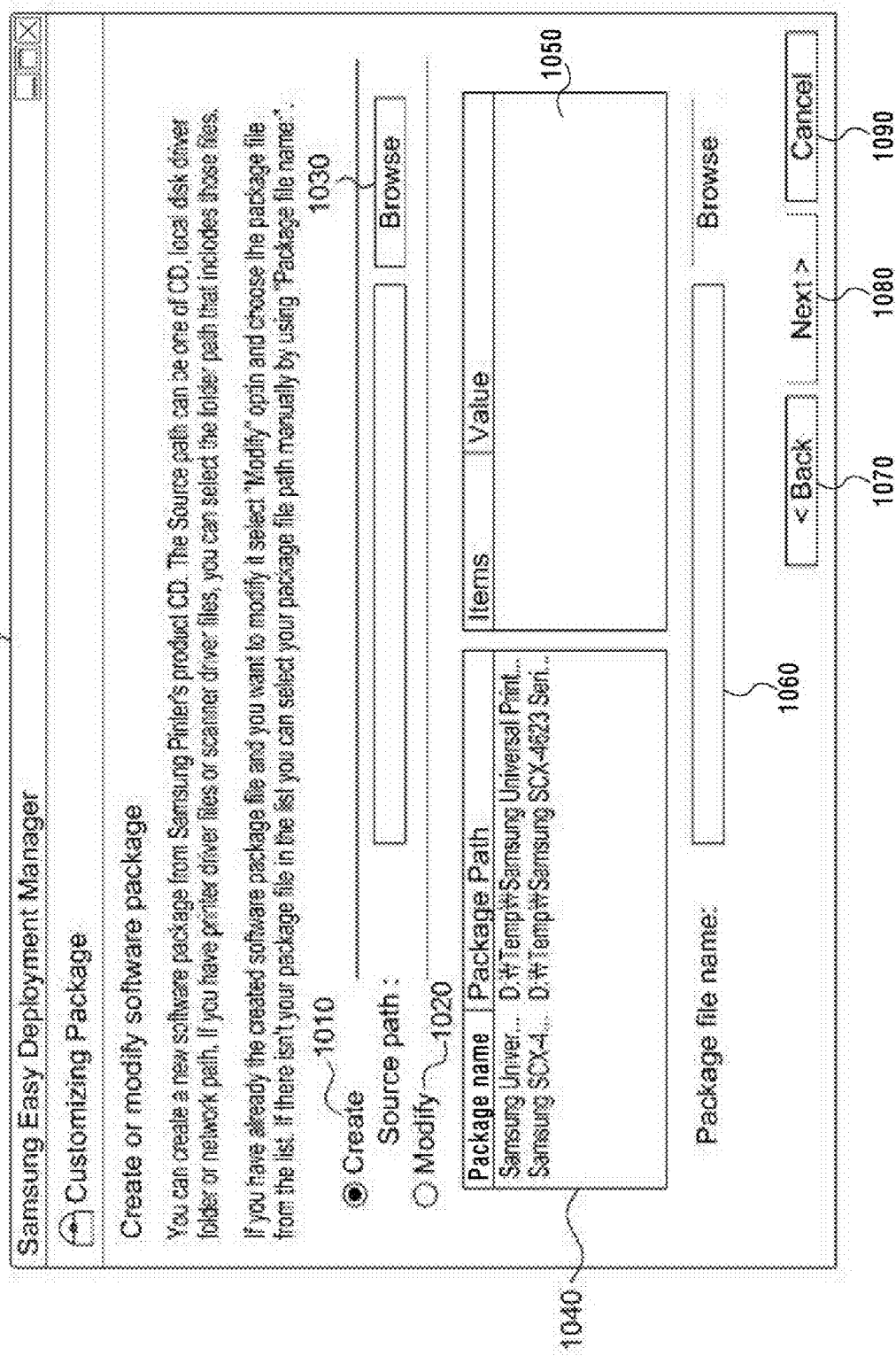
FIG. 10 is a view illustrating a UI screen which is to generate a new device driver package or select a modification of a generated device driver package according to another exemplary embodiment.
Figure 11:
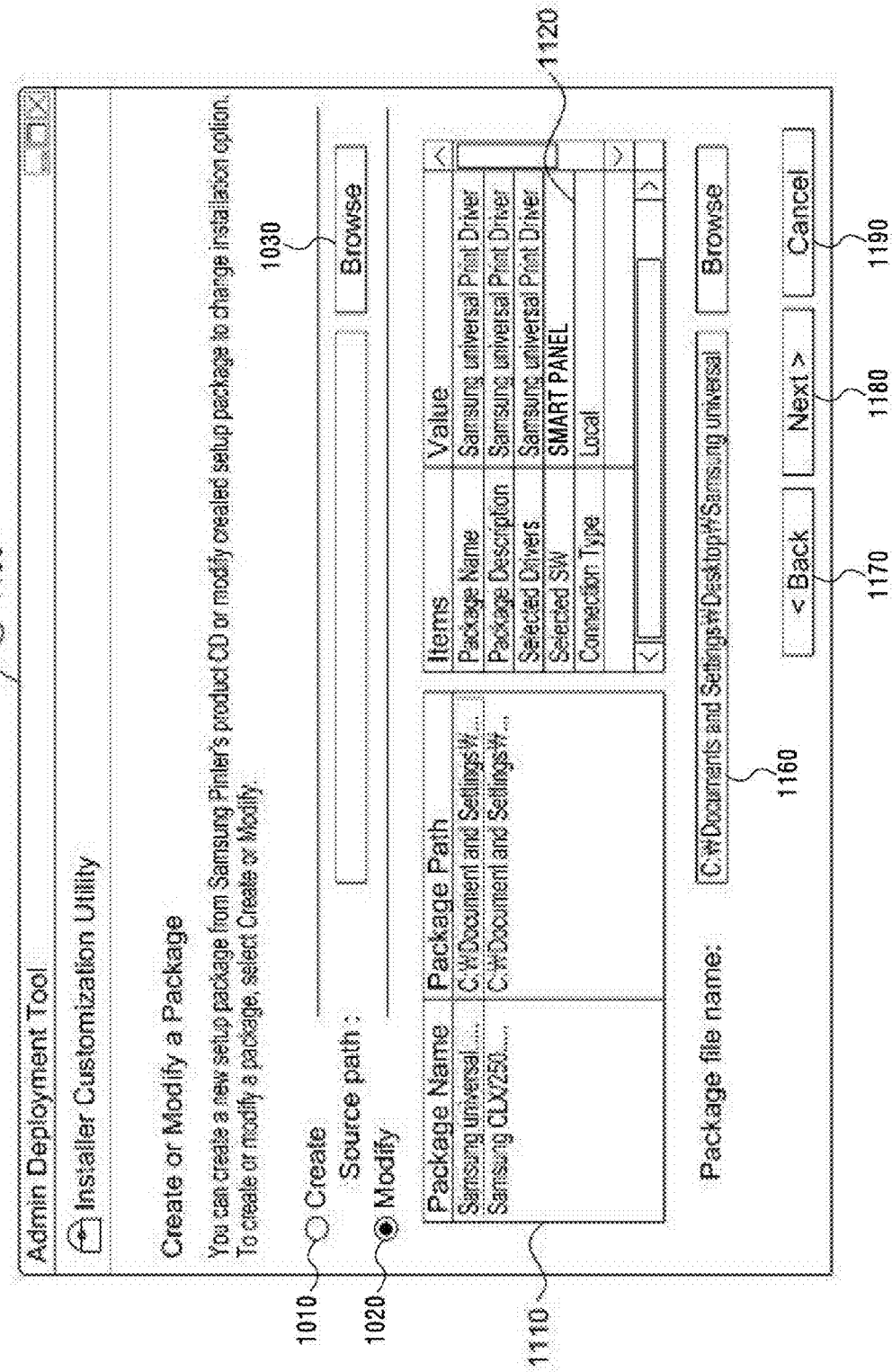
FIG. 11 is a view illustrating a UI screen which is to modify a generated driver device package according to another exemplary embodiment.
Figure 12:
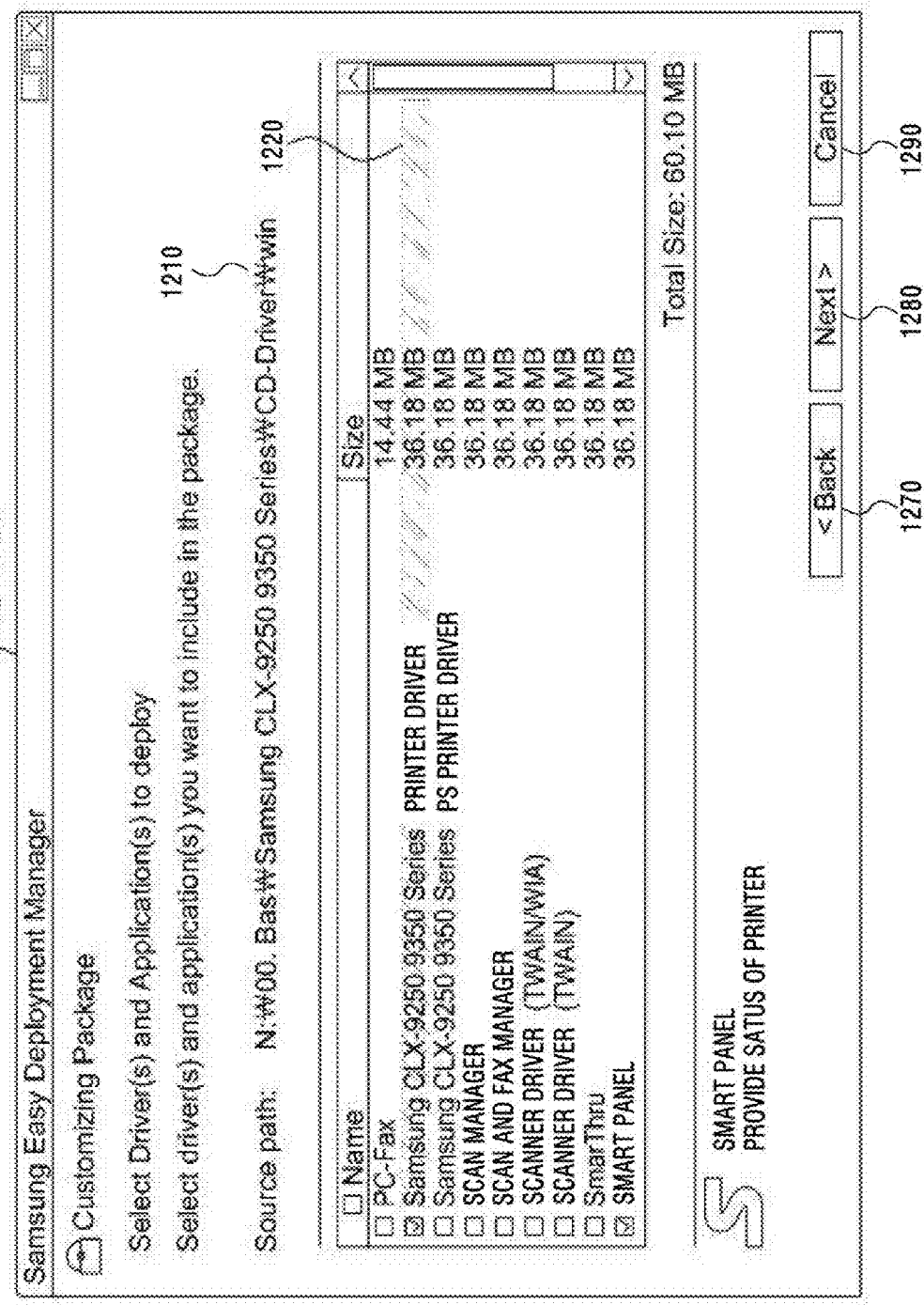
FIG. 12 is a view illustrating a UI screen which is to display a name and a status of a device driver, an application, or a solution to be included in a searched package, according to another exemplary embodiment.

FIGS. 10 through 12 are views illustrating UI screens which are used to select at least one device driver, at least one application, or at least one solution which is to be generated as a package, according to exemplary embodiments.

FIG. 10 illustrates a UI screen 1000 which is used to generate a new device driver package or select a modification of other generated device driver packages, according to an exemplary embodiment. The UI screen 1000 includes a create option 1010 that can be used to define a source path for generation of a new device driver package, and a modify option 1020 that can be used to modify other generated device driver packages. In this particular example in the UI screen 1000, the create option 1010 is selected and the modify option 1020 is not selected. Further, the package display area 1040 of FIG. 10 displays path information showing generated device driver packages and the package path information showing paths for the device driver packages for the corresponding devices. The item description area 1050 of FIG. 10 is an area to display items and values, and in this example, the item description area 1050 is empty because no package has been selected from the package display area 1040. The package file name area 1060 may be used to enter the package file name or browse a package file name with a browse button. A back button 1070 may be selected to go back to a previous UI screen and a next button 1080 may be selected to proceed to a next step (thus changing to a next UI screen). The cancel button 1090 may be selected to exit out of the package customization mode and go back to the UI screen 900 having the device driver deployment manager.

The "Browse" button 1030 for a source path in FIG. 10 may be clicked to search for another location in which a device driver, an application, or a solution is stored. Also, an additional pop-up window is displayed for the search, and at least one device driver, at least one application, or at least one solution to be selected is displayed in the pop-up window.

A device driver, an application, a solution, a device driver package, or a device driver configuration package that can be selected may be stored in at least one of a storage unit of the management apparatus 100, an optical disk drive (not shown) including a CD-ROM (not shown) and a DVD-ROM (not shown), a portable storage medium (e.g., a USB memory, a memory card, or the like) that can be connected to the management apparatus 100, a computer that can be connected to the management apparatus 100 and the wired/wireless network 150, and a web server. The device driver, the application, the solution, the device driver package, or the device driver configuration package may also be stored in a storage unit of the image forming apparatus 160 or 170.

FIG. 11 illustrates a UI screen 1100 which is used to modify a generated device driver package according to another exemplary embodiment. FIG. 11 the UI screen 1100 has the create option 1010, the browse button for the source path 1030 and the modify option 1020, which have similar features to the create option 1010, the browse button 1030 and the modify option 1020 of FIG. 10. In this example, the modify option 1020 is selected to modify the generated device driver package. The UI screen 1100 also includes a back button 1170, a next button 1180 and a cancel button 1190 having similar features to the back button 1070, the next button 1080 and the cancel button 1090 of the UI screen 1000.

Information about generated device driver package is displayed in a package display area 1110, which display generated device driver package names and their corresponding package paths. Further, the generated device driver package may be selected in the package display area 1110, as highlighted to indicate the selection. Detailed information, which corresponds to the device driver package selected in the display area 1110, is displayed in a description area 1120. The description area 1120 displays items and their corresponding values for the selected device driver package. The package file name area 1160 shows the file name for a file that corresponds to the generated device driver package selected in the package display area 1110. The generated device driver package file may be selected using the package file name area 1160 for modification.

FIG. 12 illustrates a UI screen 1200 which is to display a name and a status of a device driver, an application, or solution which is searched to be generated as a package, according to another exemplary embodiment. The next button 1080 of FIG. 10 may be selected to change from the UI screen 1000 to the UI screen 1200, after the create option 1010 is selected as shown in FIG. 10 and a source path is selected via the browse button 1030 for the source path. The UI screen 1200 also includes a back button 1270, a next button 1280 and a cancel button 1290 having similar features to the back button 1070, the next button 1080 and the cancel button 1090 of the UI screen 1000.

At least one device driver, at least one application, or at least one solution available in a source shown in the source path 1210 is displayed in a package item display area 1220. The administrator or the user may select at least one of the device driver, the application or the solution, which is to be generated as a package, in a package item display area 1220 of the displayed UI screen 1200. In this example, Samsung CLX-9250 9350 Series PRINTER DRIVER and SMART PANEL are selected in the package item display area 1220, as indicated by check marks in corresponding boxes.

If the device driver (such as the printer driver) is selected, device driver data corresponding to the selected device driver is extracted.

The device driver data includes an installation file, a type, and a name of the device driver, a type and a file name of a file configuring the device driver, information on a manufacturing company providing the device driver, and information (e.g., an hardware ID, a USB VID, a PID, or the like) on an image forming apparatus supported by the device driver.

If the application or the solution is selected, corresponding application data or corresponding solution data is extracted. The application data includes a type or installation formation of the application.

If the device driver and the application are selected together, the device driver data and the application data are discriminatively extracted.

Figure 13:
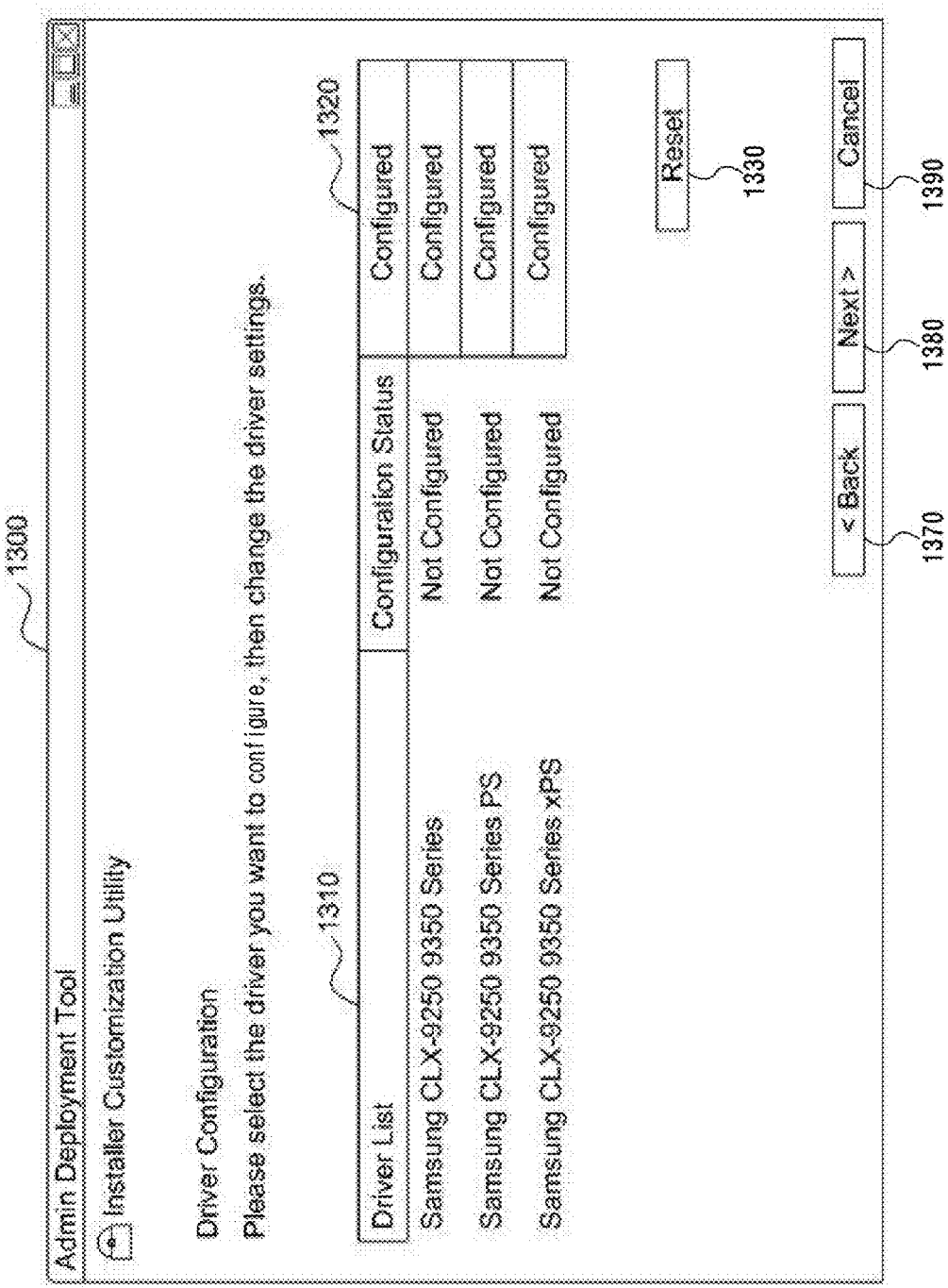
FIG. 13 is a view illustrating a UI screen which is to display a device driver to be configured, according to another exemplary embodiment.

FIG. 13 illustrates a UI screen 1300 which is to display a device driver which is to be configured, according to another exemplary embodiment.

The UI screen 1300 displays at least one device driver, at least one application, or at least one solution that has been selected. Thus, the UI screen 1300 may be presented from the UI screen 1200 when the next button 1280 of FIG. 12 is selected to change from the UI screen 1200 to the UI screen 1300, after selecting the device driver, the application or the solution in the package item display area 1210 of FIG. 12. The UI screen 1300 also includes a back button 1370, a next button 1380 and a cancel button 1390 having similar features to the back button 1070, the next button 1080 and the cancel button 1090 of the UI screen 1000.

A configuration setting 1320 of one of one or more device drivers displayed in a configuration display area 1310 is selected to set the configuration of the corresponding device driver. The configuration setting 1320 also indicates whether the driver listed on the configuration display area 1310 is configured or not configured. The reset button 1330 may be selected to reset the configuration of the device drivers to a previous setting.

Figure 14:
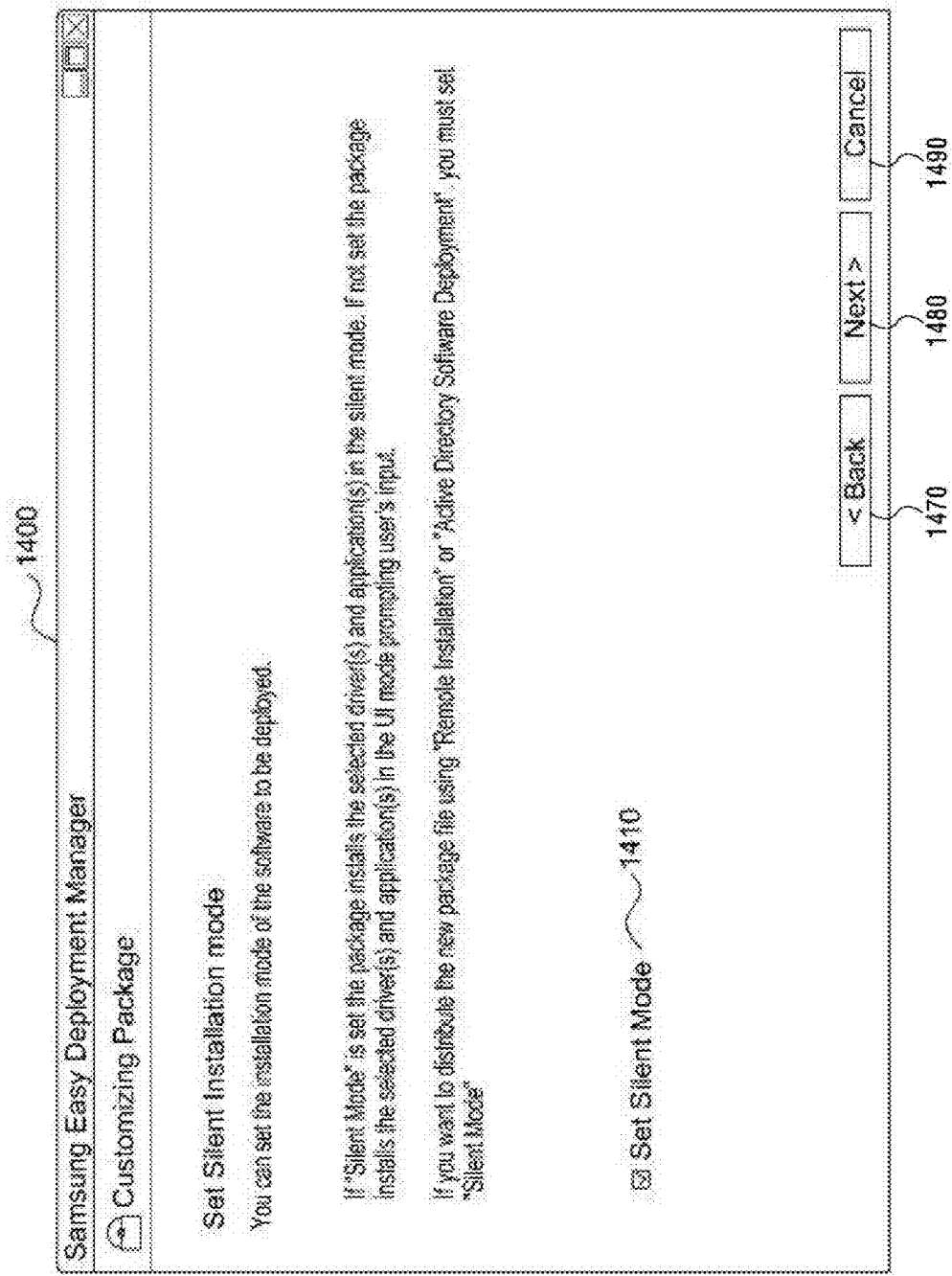
FIG. 14 is a view illustrating a UI screen which is to set a silent mode according to another exemplary embodiment.

FIG. 14 illustrates a UI screen 1400 which is to set a silent mode according to another exemplary embodiment. The UI screen 1400 may appear when the next button 1380 is selected in FIG. 13. The UI screen 1400 also includes a back button 1470, a next button 1480 and a cancel button 1490 having similar features to the back button 1070, the next button 1080 and the cancel button 1090 of the UI screen 1000.

If a generated device driver package is deployed in at least one computer, the silent mode sets the deployed device driver package to be installed without user notification or user interference.

If silent mode setting 1410 of the UI screen 1400 is selected, a silent mode is set with respect to the corresponding device diver package. If the device driver package in which the silent mode has been set is deployed in a computer installed outside the management apparatus 100, the device driver package is installed without the user notification or the user interference according to the set silent mode.

A configuration corresponding to the device driver, the application, or the solution selected in operation S301 of FIG. 3 is set as described with reference to FIGS. 10 through 14.

Figure 4:
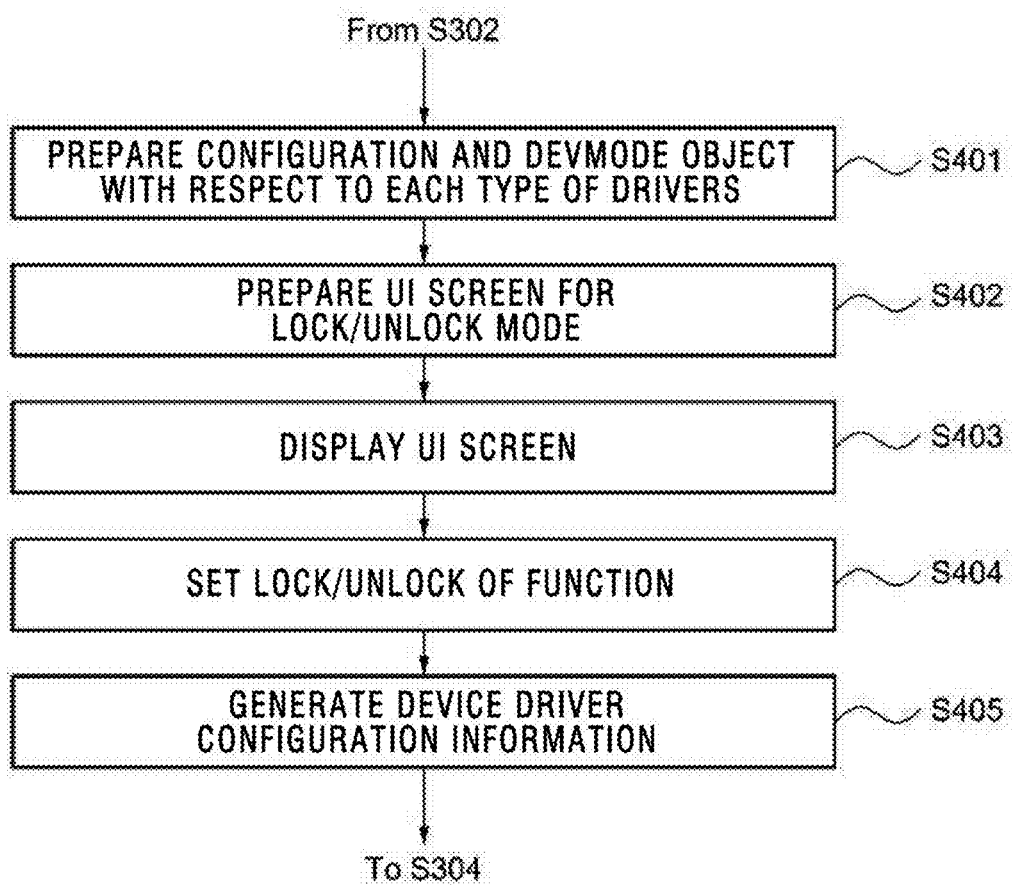
FIG. 4 is a flowchart illustrating operation S303 of FIG. 3 in more detail, according to an exemplary embodiment.

FIG. 4 is a flowchart illustrating operation S303 of FIG. 3 in more detail, according to an exemplary embodiment.

In other words, operation S303 in which the package configuration input module 231 sets or modifies the configuration of the selected device driver is described in more detail with reference to FIG. 4.

The package configuration input module 231 calls the device driver configuration module 251, and the device driver configuration module 251 prepares configuration information of each type of device drivers (e.g., a program control language or a PCL, a post script or a PS, a graphics device interface or a GDI, media access control or a Mac, or the like) and a DEVMODE object corresponding to the configuration information of the device driver at operation S401.

DEVMODE refers to a structure corresponding to parameters of a plurality of documents and a printer, and function displayed on a UI screen of the printer may be set to a parameter of DEVMODE.

When the DEVMODE object is prepared, the device driver configuration module 251 changes a lock/unlock mode into an on state and sets a flag to display a UI screen corresponding to the lock/unlock mode at operation S402.

If the flag is completely set, the device driver configuration module 251 calls the device driver UI module 252 and displays the UI screen corresponding to the lock/unlock mode on the display unit 149 at operation S403.

A function supported by the device driver is set to be locked or unlocked on the displayed UI screen according to an input of the administrator or the user (S404).

Figure 15:
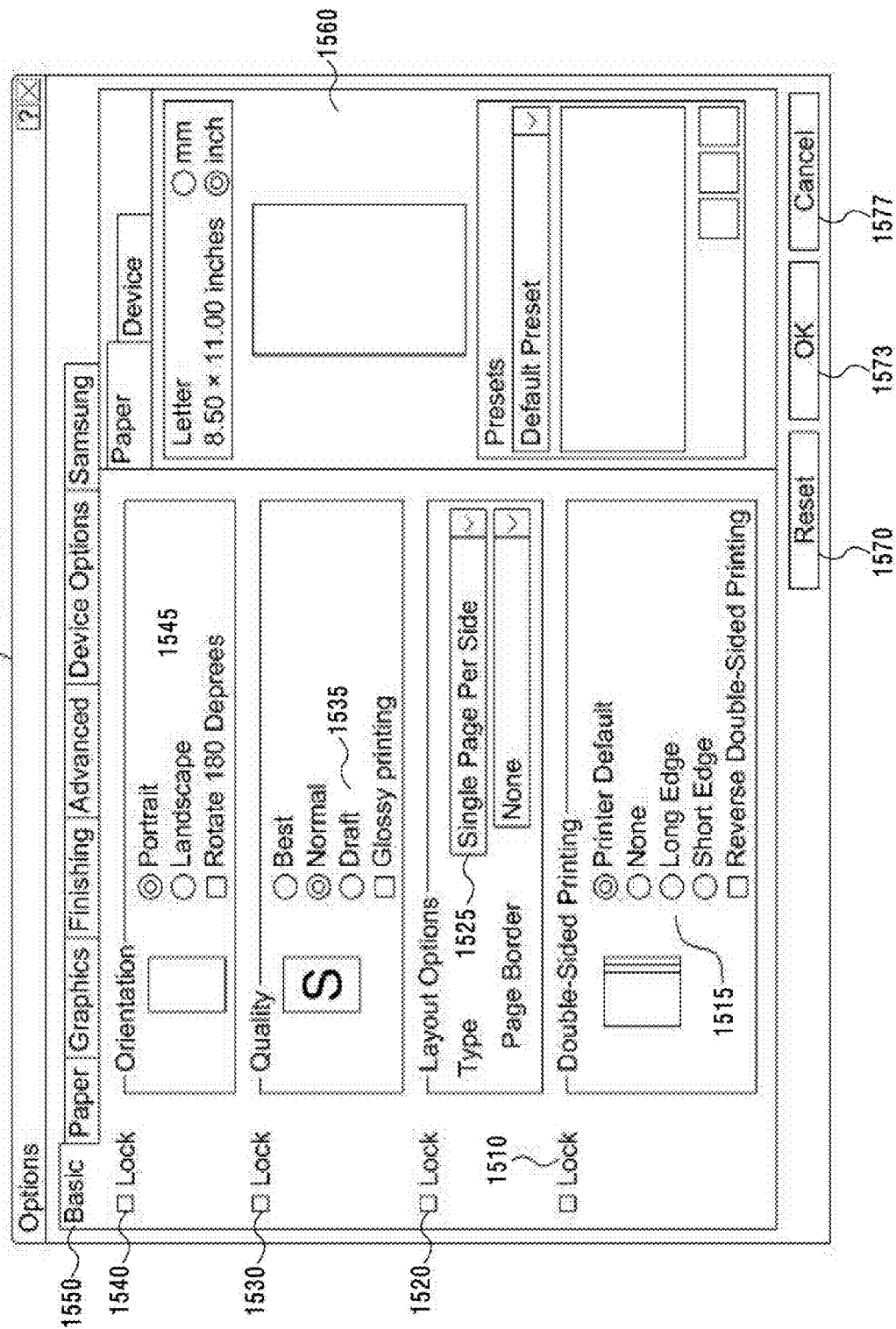
FIG. 15 is a view illustrating a UI screen which is to configure a device driver according to another exemplary embodiment.

FIG. 15 is a view illustrating a UI screen 1500 which is to configure a device driver according to another exemplary embodiment. Referring to FIG. 15, the UI screen 1500 corresponds to operation S404 of FIG. 4. A configuration of the device driver includes a lock/unlock mode which is to set at least one function supported by the device driver to be locked or unlocked.

If the function supported by the device driver has a plurality of pieces of option information, the lock/unlock mode may lock one piece of option information or a function.

For example, the lock/unlock mode may lock a double-sided printing function in a printer supporting duplex printing or may lock fax sending/receiving using a fax driver (not shown) installed in a computer to corresponding to an MFP having a fax function. In this example, the lock/unlock mode may lock the double-sided printing function 1510 or may lock one of the pieces of option information 1515 including Printer Default, None, Long Edge and Short Edge. Also, there may be a lock/unlock mode for the layout options function 1520, and its corresponding option information 1525, a lock/unlock mode for a quality function 1530 and its corresponding option information 1535, and a lock/unlock mode for a orientation function 1540 and its corresponding option information 1545. These functions are under a basic tab 1550 for basic functions. There may also be a paper setting area 1560 to configure the size of a paper to print.

If a modification of the set lock/unlock mode is required, a "Reset" button 1570 is selected to reset the lock/unlock mode. Then, any locked option information and any locked functions may be unlocked. An OK button 1573 may be selected to accept the lock/unlock modes and to proceed to operation 405 and a Cancel button 1577 may be selected to cancel and go back to a previous screen.

Device driver configuration information corresponding to the lock/unlock mode set with respect the least one function is generated at operation S405. Also, the device driver configuration information may be stored in a file format (e.g., an extensible markup language (XML) file, a trusted execution technology (TXT) file, or the like) and is not limited to a particular file format.

If operation 405 is completely performed, the method proceeds to operation S304 of FIG. 3.

The administrator or the user may determine whether modification of the device driver configuration information 255 has been modified at operation S304. If the modification of the device driver configuration information 254 is determined, the method returns to operation S303 to reset the configuration of the set device driver.

If there is no modification of the device driver configuration information 255, the device driver configuration information 255 is stored in the HDD 120 of the management apparatus 100 at operation S305.

The package configuration input module 231 sets package configuration information at operation S306.

Figure 16:
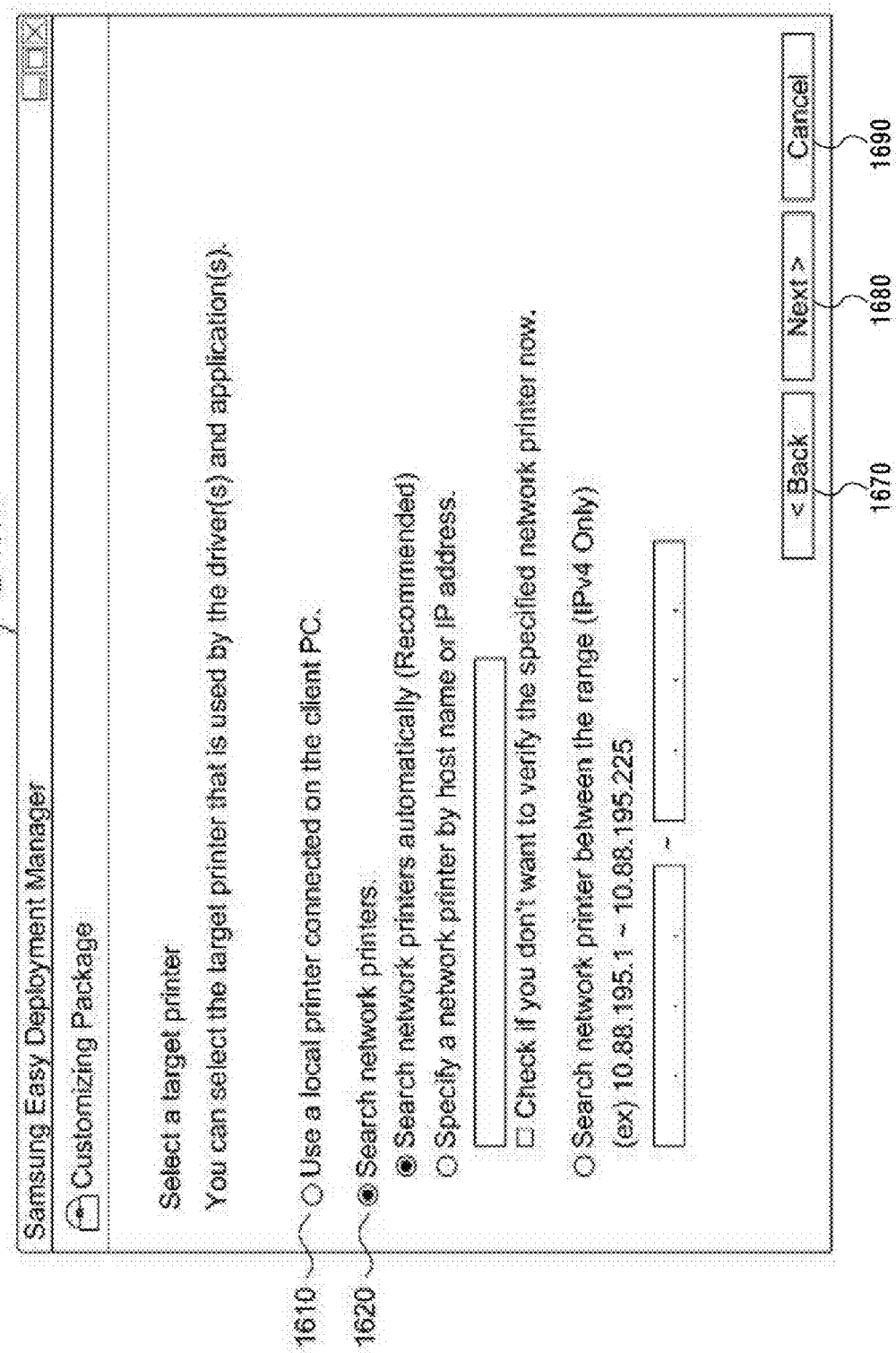
FIG. 16 is a view illustrating a UI screen which is to search for a target printer according to another exemplary embodiment.

FIGS. 16 and 17 are views illustrating UI screens corresponding to the package configuration input module 231 according to exemplary embodiments.

FIG. 16 illustrates a UI screen 1600 which is used to search for a target printer according to an exemplary embodiment.

The UI screen 1600 is to search for the target printer corresponding to a device driver (e.g., a printer driver, a scan driver, or the like) or an application (e.g., a smart panel or the like) which is to be generated as a package. The target printer may include at least one of the image forming apparatuses (e.g. the printer 160 and the MFP 170). The UI screen 1600 may be presented after selecting the OK button 1573 of FIG. 15. The UI screen 1600 also includes a back button 1670, a next button 1680 and a cancel button 1690 having similar features to the back button 1070, the next button 1080 and the cancel button 1090 of the UI screen 1000.

For example, the UI screen 1600 is used to search for a local printer as the target printer by selecting a local printer option and/or a network printer as the target printer by selecting a network printer option 1620. The local printer may be connected to the management apparatus 100 through a USB interface, and the network printer may be connected to the wired/wireless network 150.

FIG. 17 illustrates a UI screen 1700 which is to configure a package according to another exemplary embodiment. The UI screen 1700 may be presented after selecting the next button 1680 of FIG. 16 is selected. The UI screen 1700 also includes a back button 1770, a next button 1780 and a cancel button 1790 having similar features to the back button 1070, the next button 1080 and the cancel button 1090 of the UI screen 1000.

A file extension of the device driver package file, which is to be determined in operation S310 of FIG. 3, is selected as at least one of an EXE file and an MSI file using a file type selection section 1710 on the UI screen 1700.

A location in which the device driver package file is stored may be set in a package file information section 1720 by directly inputting into a file path window 1721 or is browsed and designated via the browse button 1725. Also, a description for the package file may be directly input into the description window 1727.

If the stored location is equal to a location in which a device driver, an application, or a solution to be generated as a package is stored, a device driver package may be stored together in the location in which the device driver, the application, or the solution is stored. Therefore, if an object to be packaged is selected, at least one device driver, at least one application, at least one solution, and at least one device driver package may be displayed along with the selected object.

The package configuration input module 231 may store at least one of a modification of device driver setting information and package properties to be installed as the package configuration information 237.

The device driver setting information may include an instance name of a generated device driver, a determination as to whether the device driver is shared, a share name of the device driver if it is determined that the device driver is shared, an installation of an installed device driver as a default printer of a corresponding computer, etc. Information included in the device driver setting information may be modified according to a function or a performance of a device driver.

Also, the package properties may include image forming apparatus information (e.g., an IP address, etc.) which is to be used in a generated device driver package. If a device driver to be generated as a package includes at least one device driver and at least one application, the package properties may include selection information to select a device driver and an application included in the package, installation information of the device driver (e.g., Inf file, a driver name, or the like), installation information of the application, etc. Also, the package properties may include most information extracted by the device driver information extracting module 220.

A determination is made as to whether the package configuration information 237 has been modified at operation S307. If the modification of the package configuration information 237 is determined, the method returns to operation S306 to reset the configuration of the set package configuration information.

If there is no modification of the package configuration information 237, the package configuration information 237 is stored in the HDD 120 of the management apparatus 100 at operation S308.

If the storage of the package configuration information 237 is completed, the file compression module 234 compresses the device driver configuration information 255, the package configuration information 237, the device driver, the application, the solution, the installer 235 to install the device driver, the application, or the solution in at least one computer, the device driver configuration information 255 and the package configuration information 237 that are compressed if the device driver package is executed in at least one computer, and the file extractor 236 to extract the device driver, the application, or the solution into one device driver package at operation S309.

An extension of a package file that stores the device driver configuration information 255, the package configuration information 237, the device driver, the application, the solution, the installer 235, and the file extractor 236 that are compressed, is determined at operation S310.

If the file extension of the device driver package set in the package configuration information 237 is determined as an EXE file, the device driver package is stored as a device driver package file having an EXE format at operation S311. If the file extension is an MSI file, the device driver package is stored as a device driver package file having an MSI format at operation S312.

FIG. 18 is a view illustrating a UI screen 1800 which is used to display a summary of a package according to another exemplary embodiment.

In other words, the UI screen 1800 is to display a summary of a generated device driver package on a summary window 1810.

If an administrator or a user checks the summary displayed on the UI screen 1800 and determines that a modification of a device driver package is not required, the administrator or the user clicks a "Next" button 1880 to proceed to a next step. If the modification of the device driver package is required, the administrator or the user selects clicks a "Back" button 1870 to reset the device driver package. A "Cancel" button 1890 may be selected to go back to the UI screen 900 of FIG. 9.

Figure 5:
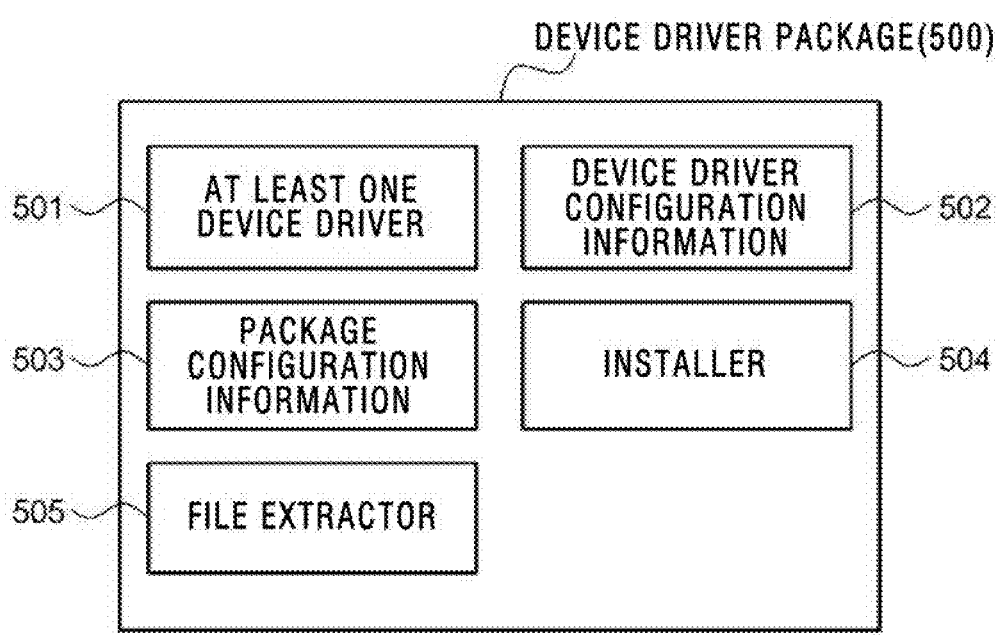
FIG. 5 is a block diagram illustrating a device driver package according to an exemplary embodiment.

FIG. 5 is a block diagram illustrating a device driver package 500 according to an exemplary embodiment.

Referring to FIG. 5, the device driver package 500 includes at least one device driver 501, device driver configuration information 502, package configuration information 503, an installer 504, and a file extractor 505. At least one of the installer 504 and the file extractor 505 may be excluded when generating the device driver package 500.

The stored device driver package file is deployed using at least one of a remote installation and an AD deployment at operation S313.

At least one of the remote installation 920 and the AD deployment 930 is selected on the initial UI screen 900 of the device driver deployment manager of FIG. 9 to deploy the generated device driver package file outside the management apparatus 100.

A deployment mode to deploy the generated device driver package outside the management apparatus 100 may include at least one of the remote installation 920 and the AD deployment 930.

If at least one of the remote installation 920 and the AD deployment 930 is selected on the initial UI screen 900, the initial UI screen 900 is changed.

FIG. 19 is a view illustrating a UI screen 1900 which is used to log on an administrator account according to another exemplary embodiment. In other words, the UI screen 1900 is to log on the administrator account using a domain, an ID, and a password corresponding to the administrator account that can be entered in the log-on section 1910 to deploy a device driver package. The log-on button 1920 may be selected to log on after entering the domain, the ID and the password in the log-on section 1910. The UI screen 1900 also includes a back button 1970, a next button 1980 and a cancel button 1990 having similar features to the back button 1070, the next button 1080 and the cancel button 1090 of the UI screen 1000.

Figure 20:
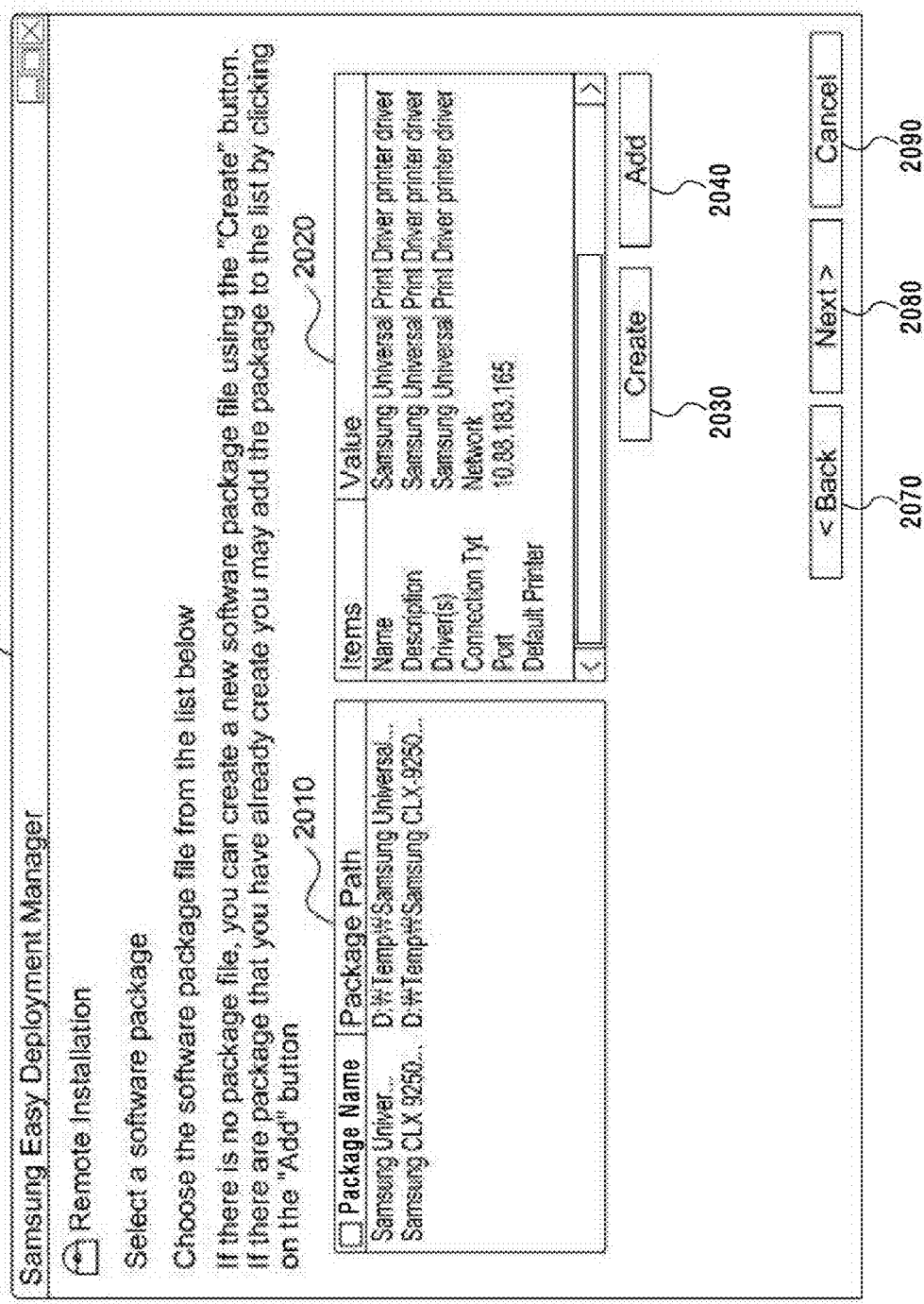
FIG. 20 is a view illustrating a UI screen which is to execute a remote installation according to another exemplary embodiment.

FIG. 20 is a view illustrating a UI screen 2000 which is used to execute a remote installation according to another exemplary embodiment. The UI screen 2000 may be presented after selecting the next button 1980 of FIG. 19.

At least one of a device driver package or a device driver configuration package to be deployed using the remote installation is selected through a package display area 2010 of the UI screen 2000 which is modified to correspond to the log-on of FIG. 19.

A summary of at least one of the selected device driver package or device driver configuration package is displayed in a description area 2020. Further, the create button 2030 may be selected to create a new package file, and the add button 2040 may be selected a created package to the list in the package display area 2110. The UI screen 2000 also includes a back button 2070, a next button 2080 and a cancel button 2090 having similar features to the back button 1070, the next button 1080 and the cancel button 1090 of the UI screen 1000.

At least one computer (e.g., the first computer 180 or the second computer 190) in which at least one of the selected device driver package or device driver configuration package is to be deployed is selected.

At least one of the device driver package and the device driver configuration package is transmitted to the selected computer to correspond to the selected computer.

Figure 21:
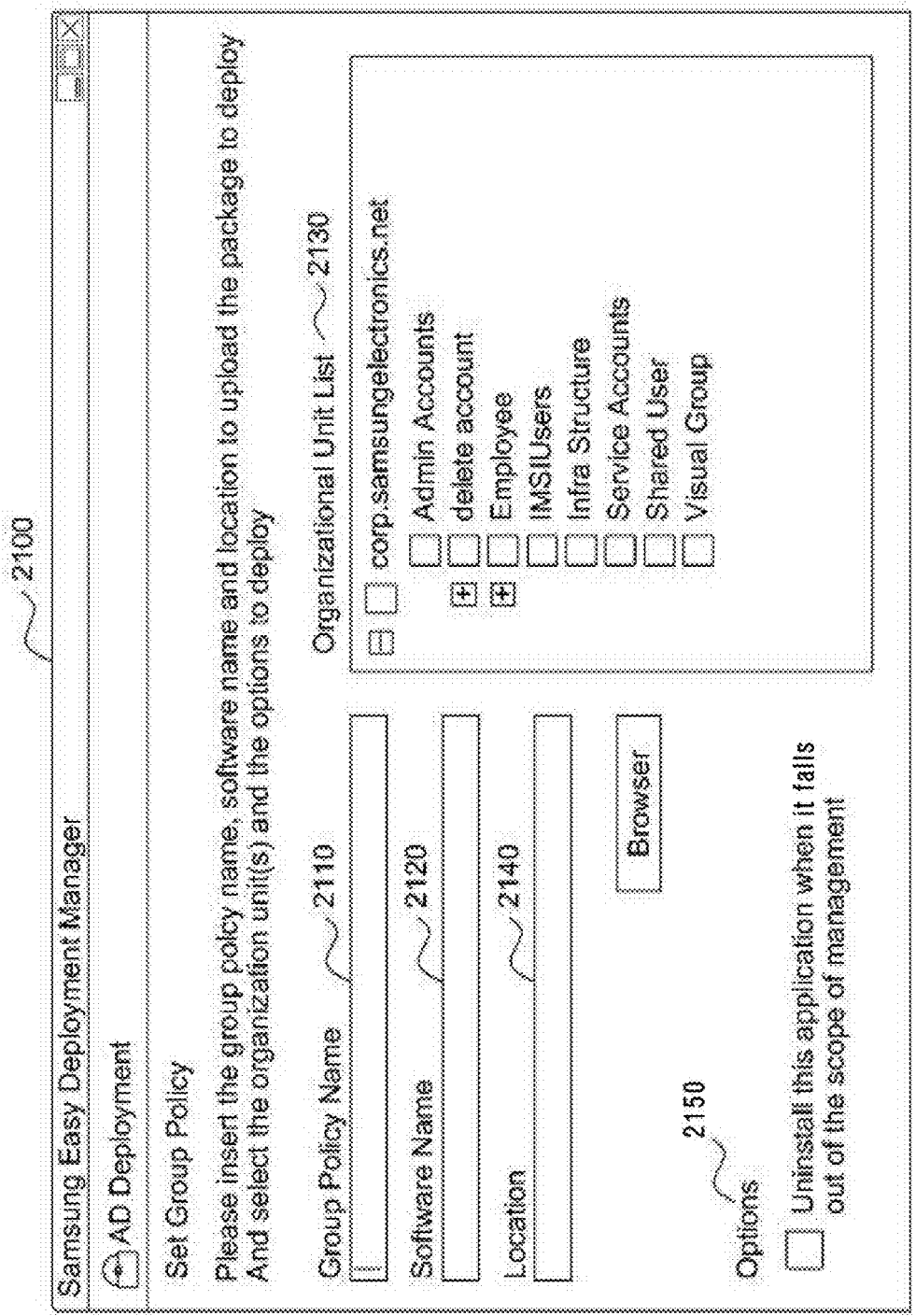
FIG. 21 is a view illustrating a UI screen which is to execute an AD deployment according to another exemplary embodiment.

FIG. 21 is a view illustrating a UI screen 2100 which is to execute an AD deployment according to another exemplary embodiment. The UI screen 2100 may be presented when the AD deployment 930 is selected from the UI screen 900.

AD deployment information for the AD deployment is set through the UI screen 2100 which is modified to correspond to the log-on of FIG. 19.

The AD deployment information is data necessary for the AD deployment, e.g., may include a group policy name that can be specified in a Group Policy Name section 2110, a device driver package name that can be specified in a Software Name section 2120, an organization unit that can be specified in the Organizational Unit List 2130 to deploy a device driver package, a share folder name that can be specified in a location section 2140, wherein the device driver package is to be uploaded to the share folder name, and may also include group policy option information, etc. Further, the option 2150 may be checked to uninstall the application when it falls out of the scope of management.

At least one of at least one device driver package and at least one device driver configuration package is selected. At least one of the device driver package and the device driver configuration package which are to be deployed using the AD deployment is uploaded to an AD server of an AD domain using the set AD deployment information.

If a user selects and executes at least one of the device driver package or the device driver configuration package transmitted to the computer or downloaded from the AD server or executes the in a silent mode, the device driver 501 included in the device driver package is installed in the computer using the device driver configuration information 502 and the package configuration information 503. At least one device driver modification information included in the device driver configuration package may modify a configuration of a device driver installed in a computer.

The installation result of the device driver is checked through at least one of a corresponding computer (e.g., the controller 161 of the first computer 180) and an installed device driver, is transmitted to the management apparatus 100 through the communication interface unit 183 of the corresponding computer, and is stored as history information in the HDD 120.

Figure 22:
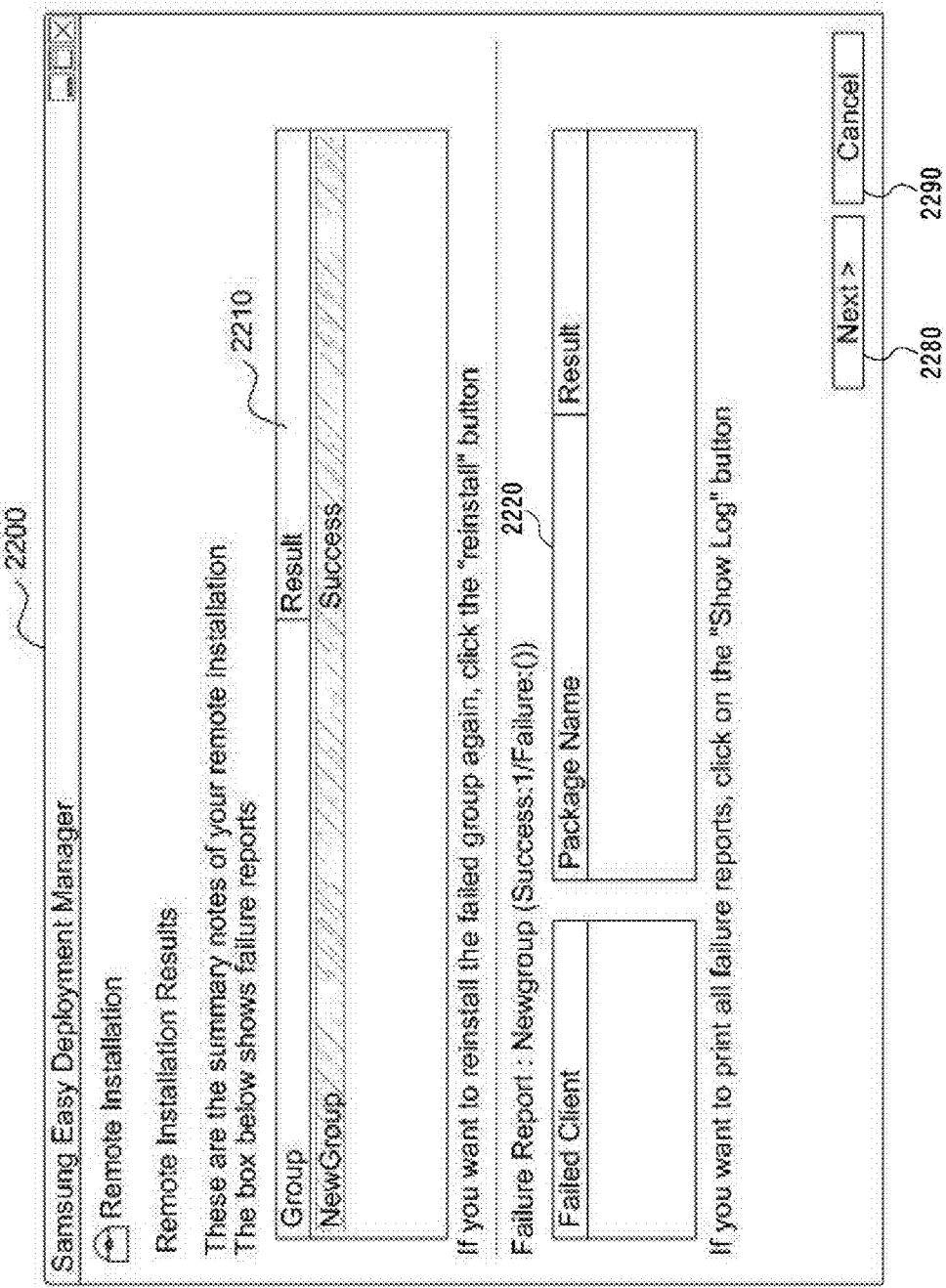
FIG. 22 is a view illustrating a UI screen which is to display results of a remote installation according to another exemplary embodiment.

FIG. 22 is a view illustrating a UI screen 2200 which is to display results of a remote installation according to another exemplary embodiment.

Referring to FIG. 22, an installation result of a device driver package or a device driver configuration package is displayed on the UI screen 2200. Result "Success" is displayed in an installation result display area 2210. Because there is no failure and one success in this example, a failure report area 2220 does not display any failed client or failed package name. Also, a next button 2280 may be selected to proceed to the next screen, and the cancel button 2290 may be selected to cancel out of the UI screen 2200.

Figure 23:
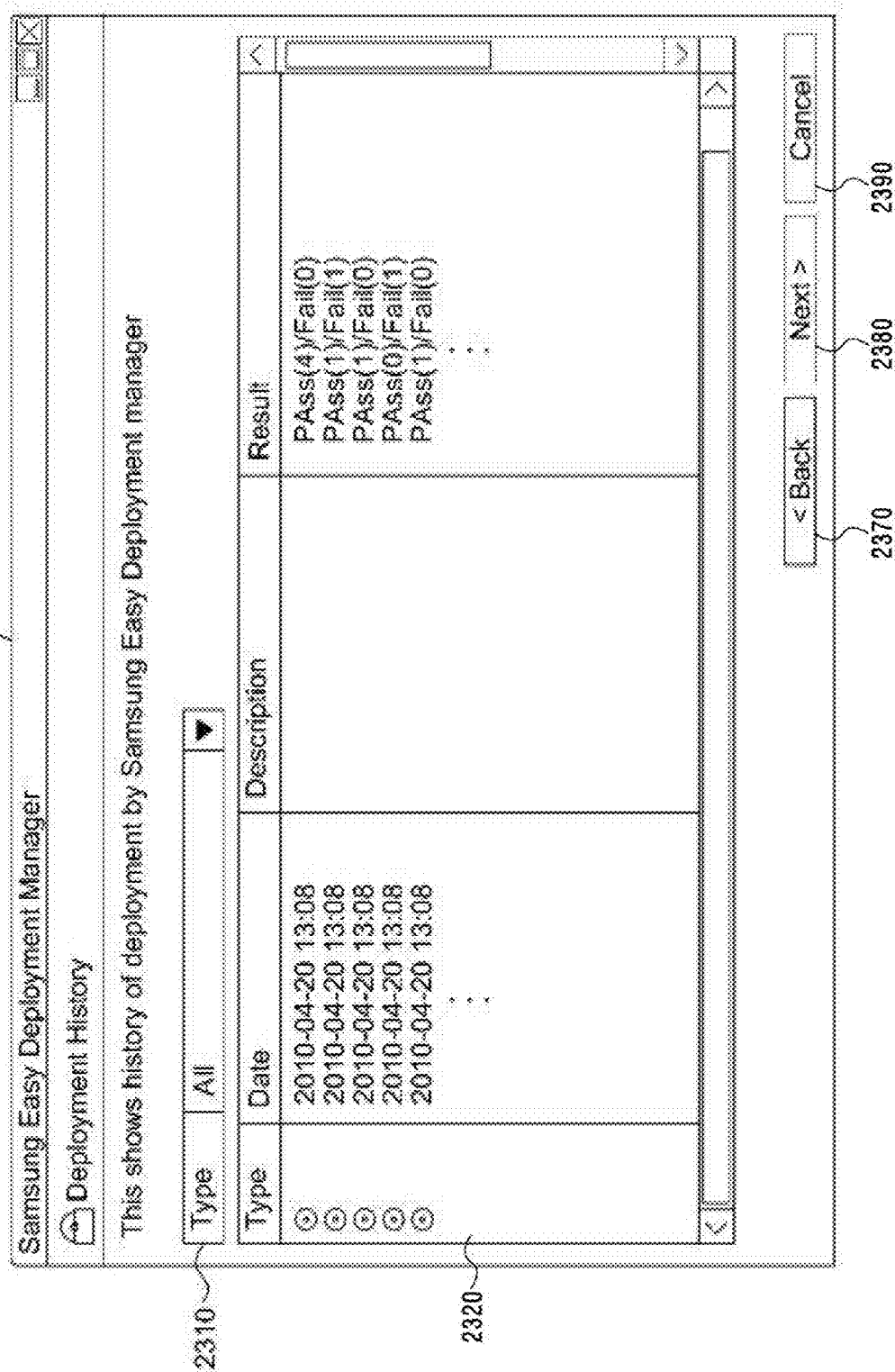
FIG. 23 is a view illustrating a UI screen which is to display a history of a package according to another exemplary embodiment.

FIG. 23 is a view illustrating a UI screen 2300 which is to display a history of a package according to another exemplary embodiment. The UI screen 2300 may be presented when the next button 2080 of FIG. 20 or the next button 2280 of FIG. 22 is selected.

If Type 2310 is selected on the UI screen 2300 of FIG. 23, an option to select a remote installation, an AD deployment, or All is displayed. If an administrator or a user selects one of the above three types, at least one device driver package or at least one device driver configuration package corresponding to the selected type is displayed.

Referring to FIG. 23, the "All" is selected in the Type 2310 to display a previous device driver package or a previous device driver configuration package displayed in a history section 2320 in a device driver deployment manager. The display device driver package or device driver configuration package may be sorted. An installation result of a device driver package or a modification result of a device driver configuration package deployed in at least one computer may be displayed together.

Figure 6:
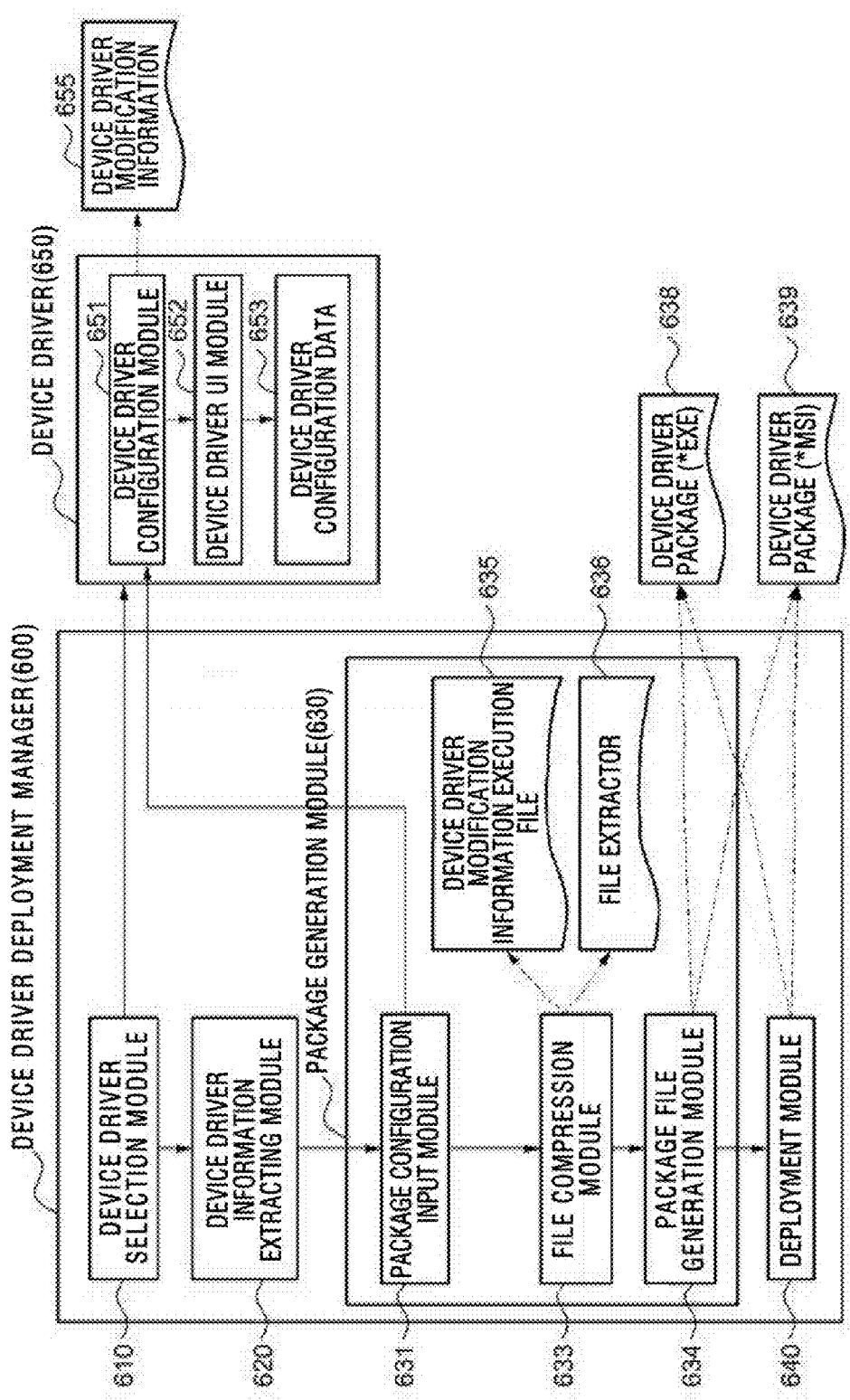
FIG. 6 is a block diagram illustrating a device driver deployment manager and a device driver of a management apparatus according to another exemplary embodiment.

FIG. 6 is a block diagram illustrating a device driver deployment manager 600 and a device driver 650 of a management apparatus according to an exemplary embodiment.

FIG. 6 illustrates the device driver deployment manager 600 and the device driver 650 of the management apparatus 100 of FIG. 1 in detail.

Referring to FIG. 6, the device driver deployment manager 600 includes a device driver selection module 610, a device driver information extracting module 620, a package generation module 630, and a deployment module 640. The package generation module 630 includes a package configuration input module 631, a file compression module 633, a package file generation module 634, and a file extractor 636.

The device driver 650 includes a device driver configuration module 651, a device driver UI module 652, and device driver configuration data 653.

According to another exemplary embodiment, the device driver 650 may further include at least one common device driver.

The common device driver is a device driver that can be commonly used in one type of image forming apparatuses. Examples of the common device driver include a common printer driver that can be commonly used in a plurality of printers, a common fax driver that can be commonly used in a plurality of fax machines, and a common scanner driver that can be commonly used in a plurality of scanners.

The device driver selection module 610 receives a selection of at least one device driver, which is to be generated as a package, from an administrator or a user. The device driver selection module 610 may also receive a selection of at least one application or at least one solution.

The administrator or the user may select another generated device driver package or another generated device driver configuration package.

The device driver, the application, the solution, the device driver package, or the device driver configuration package that can be selected may be stored in at least one of a storage unit of the management apparatus 100, an optical disk drive (not shown), such as a CD-ROM (not shown) or a DVD-ROM (not shown), a portable storage medium (e.g., a USB memory, a memory card, or the like) that can be connected to the management apparatus 100, a computer that can be connected to the wired/wireless network 150, and a web server. The device driver, the application, the solution, the device driver package, or the device driver configuration package may be stored in a storage unit of the image forming apparatus (e.g. the printer 160 or the MFP 170).

If another stored device driver package or another stored device driver configuration package is selected, the device driver deployment manager 600 may edit and use or modify the selected stored device driver package or the selected stored device driver configuration package.

The device driver information extracting module 620 extracts device driver data corresponding to the device driver selected to generate the package. The device driver data includes a device driver installation file, a device driver type, a device driver name, a type and a file name of a file configuring a device driver, information on a manufacturing company providing the device driver, and information (e.g., a hardware ID, a USB VID, or a PID) on an image forming apparatus supported by the device driver.

If another stored device driver configuration package is selected, the device driver information extracting module 620 unpacks the selected device driver configuration package to extract the device driver data.

The package generation module 630 includes the package configuration input module 631, the file compression module 633, and the package file generation module 634. The package generation module 630 further includes a device driver modification information installation file 635 and the file extractor 636.

The package configuration input module 631 sets or modifies and stores a configuration of a device driver using information of the device driver configuration module 651 extracted by the device driver information extracting module 620. For example, the set or modification of the configuration of the device driver includes setting of a lock/unlock mode on a UI screen corresponding to the device driver, wherein the UI screen is displayed using the UI module 252.

The result of the set or modification of the configuration of the device driver is stored as device driver modification information 655 in a HDD. This result may be the device driver configuration data 653 which can be stored as the device driver modification information 655.

If the storage of the device driver modification information 655 is completed, the device driver modification information 655 is compressed using the file compression module 633. Here, if the device driver modification information 655, the device driver modification information execution file 635, at least one device driver, or at least one device driver configuration package is executed, the compressed device driver modification information 655, the device driver modification execution file 635, the file extractor 636 extracting at least one device driver are compressed into one device driver package.

The package file generation module 634 generates the device driver modification information 655 compressed by the file compression module 633, the device driver modification execution file 635, and the file extractor 636 as one device driver configuration package file and stores the device driver configuration package file in a HDD. A file extension of the stored device driver configuration package file is set by the package configuration input module 631.

In other words, if the file extension is an EXE file, the device driver configuration package file is stored as a device driver package file 638 having an EXE format. If the file extension is an MSI file, the device driver configuration package file is stored as a device driver package file 639 having an MSI format.

Figure 8:
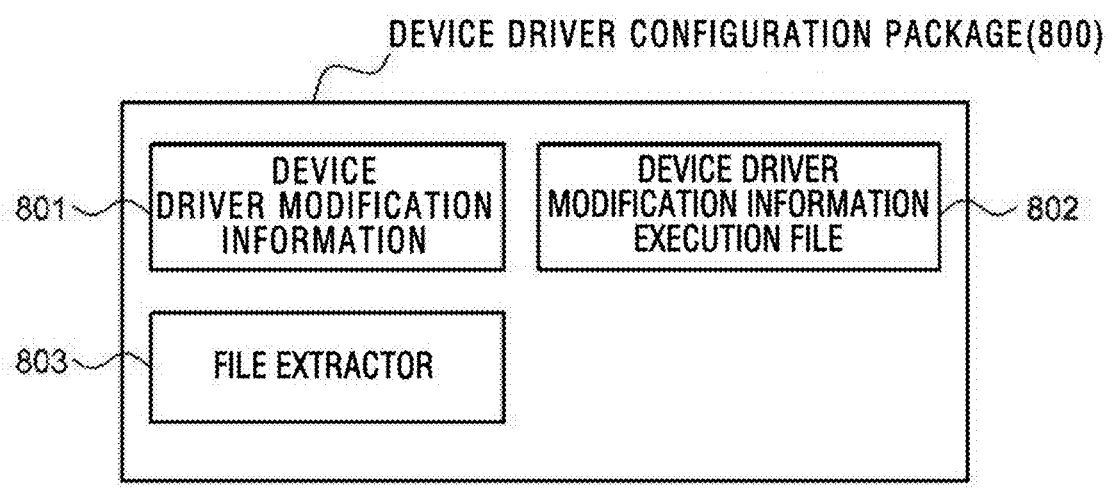
FIG. 8 is a block diagram illustrating a device driver configuration package according to an exemplary embodiment.

FIG. 8 is a block diagram illustrating a device driver configuration package 800 according to another exemplary embodiment.

Referring to FIG. 8, the device driver configuration package 800 includes device driver modification information 801, a device driver modification information execution file 802, and a file extractor 803. The device driver configuration package 800 may be generated as the device driver modification information 801 and the device driver modification information execution file 802, and the file extractor 803 may be generated as a file separately from the device driver configuration package 800. Therefore, the device driver configuration package 800 not including the file extractor 803 may be respectively deployed in the first computer 180 or the second computer 190.

The deployment module 640 deploys the device driver configuration package generated by the package generation module 630 outside the management apparatus 100. In other words, the generated device driver configuration package may be deployed using at least one of a remote installation and an AD deployment. Here, the remote installation is used to transmit the device driver configuration package to at least one computer in which a device driver has been installed, and the AD deployment uses an AD of an AD domain to deploy the device driver configuration package in the AD. Here, the deployment method may be selected by an administrator or a user.

AD deployment information is data necessary for the AD deployment, and includes, for example, a group policy name, a device driver package name, an organization unit to deploy the device driver package, a share folder name to which the device driver package is to be uploaded, group policy option information, etc.

The generated device driver package may be deployed through a web, various deployment policies, or various deployment systems.

Figure 7:
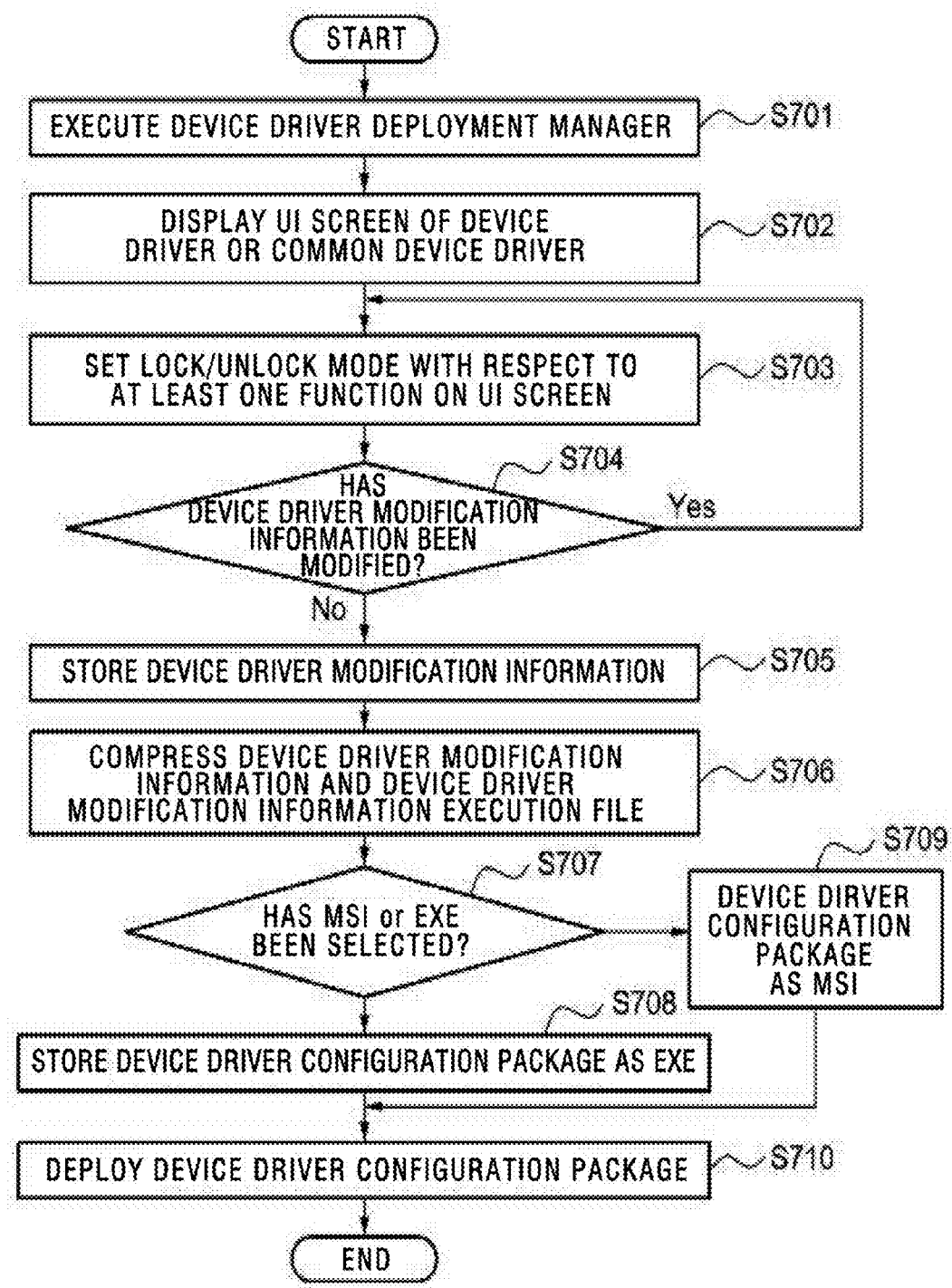
FIG. 7 is a flowchart illustrating a method of managing a device driver of a management apparatus according to another exemplary embodiment.

FIG. 7 is a flowchart illustrating a method of managing a device driver of a management apparatus according to another exemplary embodiment.

A method of managing a device driver of the management apparatus 100 will be described in relation with a generation of a device driver configuration package.

A device driver deployment manager is executed using the input unit 148 and the display 149 connected to the management apparatus 100 at operation S701.

A UI screen of a device driver or a common device driver corresponding to at least one image forming apparatus is displayed at operation S702.

Referring to FIG. 9, the driver configuration mode 940 is selected on the initial UI screen 900 of the executed device driver deployment manager. Also, a UI screen of a device driver or a common device driver corresponding to at least one image forming apparatus or at least one computer is displayed.

Figure 24:
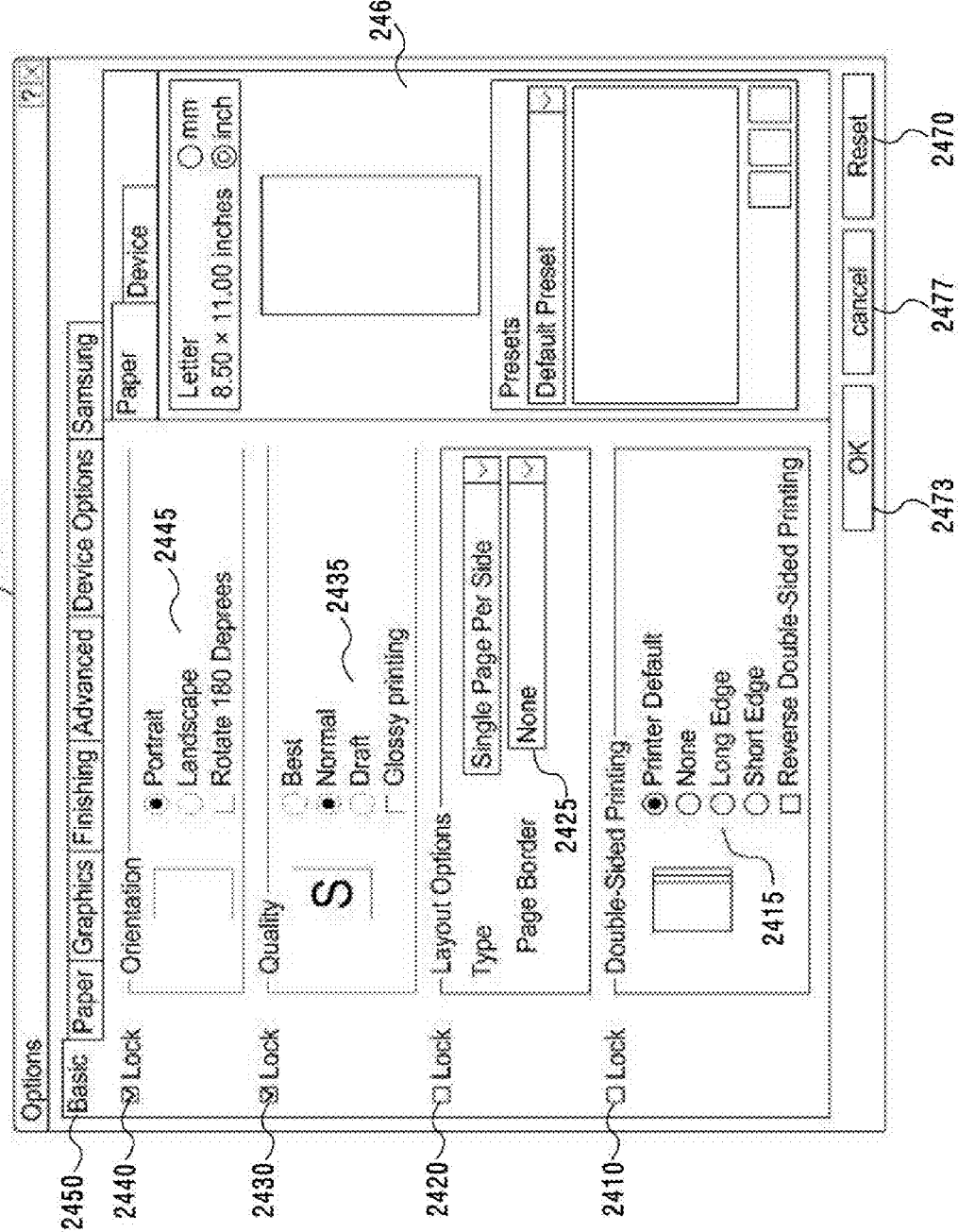
FIG. 24 is a view illustrating a UI screen which is to modify a configuration of a device driver configuration according to another exemplary embodiment.

FIG. 24 is a view illustrating a UI screen 2400 which is to modify a configuration of a device driver configuration according to another exemplary embodiment. The UI screen 2400 corresponds to operation S703 of FIG. 7. Also, the UI screen 2400 may be presented if the driver configuration mode 940 is selected on the initial UI screen 900.

A lock/unlock mode is to lock or unlock at least one function supported by a device driver on the UI screen 2400 of the device driver.

If the function supported by the device driver has a plurality of pieces of option information, the lock/unlock mode locks one piece of option information or a function.

For example, the lock/unlock mode may lock double-sided printing in a printer supporting duplex printing or fax sensing/receiving functions of an MFP having a fax function. In this example, the lock/unlock mode may lock the double-sided printing function 2410 or may lock one of the pieces of option information 2415 including Printer Default, None, Long Edge and Short Edge. Also, there may be a lock/unlock mode for the layout options function 2420, and its corresponding option information 2425, a lock/unlock mode for a quality function 2430 and its corresponding option information 2435, and a lock/unlock mode for a orientation function 2440 and its corresponding option information 2445. These functions are under a basic tab 2450 for basic functions. There may also be a paper setting area 2460 to configure the size of a paper to print.

If a modification of the lock/unlock mode is required, a "Reset" button 2470 is selected to reset the lock/unlock mode. Then, any locked option information and any locked functions may be unlocked. Alternatively, the lock/unlock mode may unlock the one piece of option information 2410 and the function 2420. An OK button 2473 may be selected to accept the lock/unlock modes and to proceed to operation 405 and a Cancel button 2477 may be selected to cancel and go back to a previous screen.

If the device driver that sets the lock/unlock mode at operation S703 is not a common device drive, a configuration of the device driver may be set or modified similarly to the operations described with reference to FIG. 4. For example, if the device driver is the common device driver, the DEVMODE object is prepared at operation S401, and other operations 402 through 405 may be equally applied.

An administrator or a user determines whether the device driver modification information 655 has been modified at operation S704. If the modification of the device driver modification information 655 is determined, the method returns to operation S703 to reset the configuration of the device driver.

If there is no modification of the device driver modification information 655, the device driver modification information 655 is stored in the HDD 120 of the management apparatus 100 at operation S705.

The device driver modification information may be stored as a file (e.g., an XML file, a TXT file, or the like) and is not limited to a particular file format.

If the storage of the device driver modification information 655 is completed, and the device driver modification information 655, the device driver modification information execution file 635, or the deployed device driver configuration package is executed in at least one computer, the file compression module 633 compresses the compressed device driver modification information 655 and the file extractor 636 to extract the device driver modification information execution file 635 into one device driver configuration package at operation S706.

A file extension of the device driver configuration package including the compressed device driver modification information 655, the device driver modification information execution file 635, or the file extractor 636 is determined at operation S707.

Figure 25:
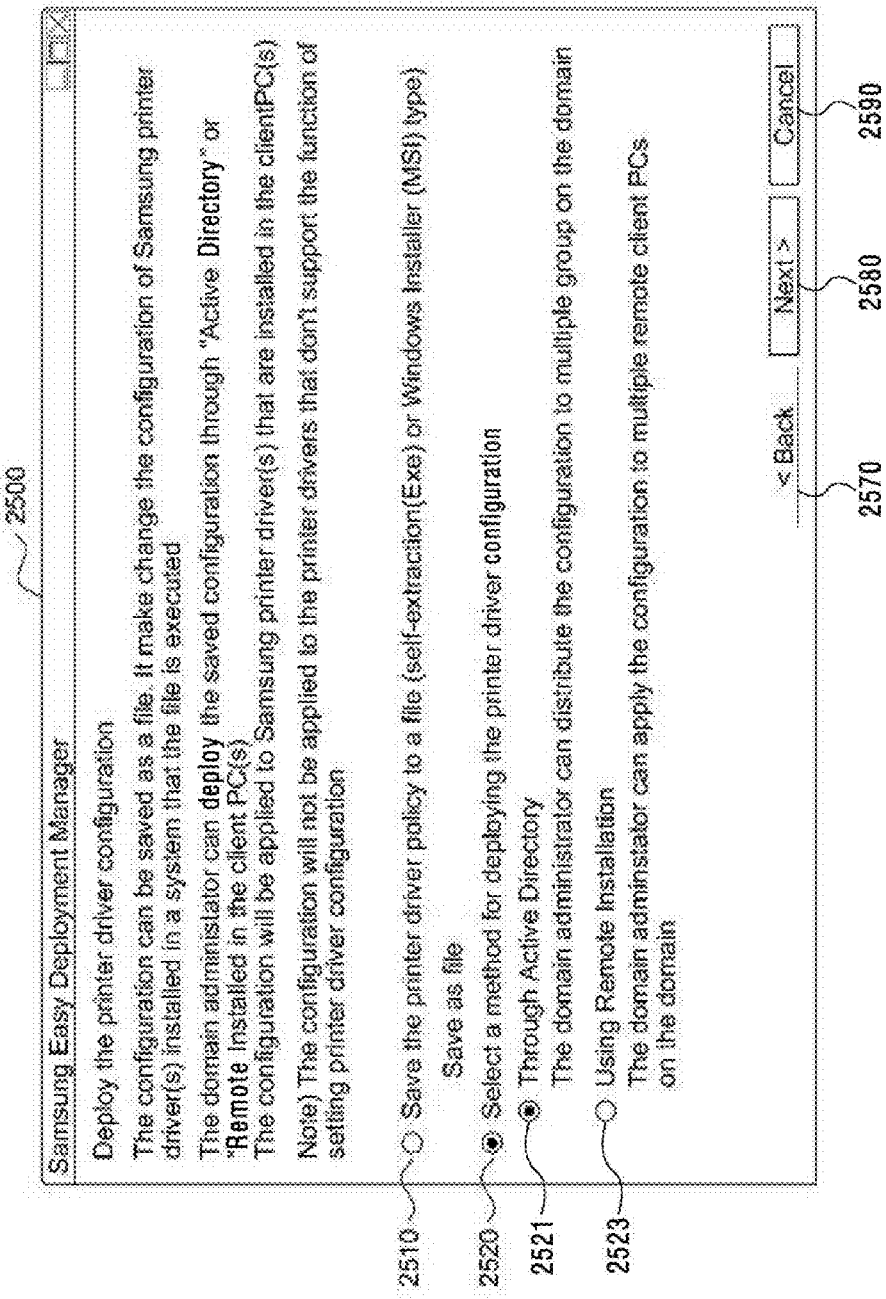
FIG. 25 is a view illustrating a UI screen which is to select a storage method and a deployment method of a modified configuration of a device driver according to another exemplary embodiment.

FIG. 25 is a view illustrating a UI screen 2500 which is to select a storage method and a deployment method of a modified configuration of a device driver according to another exemplary embodiment. The UI screen 2500 may be presented after selecting the OK button 2473 of FIG. 24. The UI screen 2500 also includes a back button 2570, a next button 2580 and a cancel button 2590 having similar features to the back button 1070, the next button 1080 and the cancel button 1090 of the UI screen 1000.

Referring to FIG. 25, a fixation of a file extension of a device driver configuration package to at least one of an EXE file and an MSI file may be performed if a storing option 2510 is selected on the UI screen 2500. Then, the device driver configuration package is stored as the fixed at least one file extension. The file extension of the device driver configuration package is selected as one of an EXE file and an MSI file.

Alternatively, deployment of the printer driver configuration package via the AD or the remote installation may be performed if the deployment option 2510 is selected. Under the deployment option 2510, the AD option 2521 or the remote installation option 2523 may be selected. In this example, the deployment option 2510 is selected instead of the storing option 2510, and the AD option 2521 is selected.

If the file extension of the device driver configuration package is an EXE file, the device driver configuration package is stored as a device driver configuration file having an EXE form at operation S708. If the file extension of the device driver configuration package is an MSI file, the device driver configuration package is stored as a device driver configuration package file having an MSI format at operation S709.

Referring to FIG. 9, the stored device driver configuration package file is deployed outside the management apparatus 100 using at least one of the remote installation deployment 920 and the AD deployment 930 included in the deployment mode on the initial UI screen 900 of the device driver deployment manager.

If a user selects and executes at least one device driver configuration package which is transmitted to at least one computer using a remote installation or is downloaded from an AD using an AD deployment or executes the device driver configuration package in a silent mode, at least one device driver modification information and at least one device driver modification configuration information included a the deployed device driver configuration package are extracted by a file extractor.

The extracted at least one device driver modification information and a device driver modification information execution file are executed to modify a configuration of a device driver installed in a computer (e.g., the first computer 180), In other words, the device driver modification information execution file is executed to modify the extracted device driver modification information with reference to a device driver list (not shown) installed in the corresponding computer, so that a device driver of the corresponding computer recognizes the extracted device driver modification information. The modified device driver modification information is read from a device driver configuration module (not shown) of the corresponding computer.

The device driver modification execution file modifies the configuration of the device driver installed in the corresponding computer using the modified driver modification information. In other words, at least one of a registry of a computer, a modification of device driver configuration data stored as an additional file, and a modification of DEVMODE may be executed.

If a plurality of device drivers are installed in the corresponding computer, the above-described processes may be modified to respectively correspond to the plurality of device drivers.

The modification result of the configuration of the device driver is checked by at least one of the controller 161 of the corresponding computer and an installed device driver, transmitted to the management apparatus 100 through the communication interface unit 183 of the corresponding computer, and stored as history information in the HDD 120.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains. Thus, methods according to the exemplary embodiments of the present general inventive concept can be embodied as program command formats which can be executed through various types of computers and can be recorded on computer-readable medium. The computer-readable medium can individually include program commands, data files, data structures, or combinations thereof. The program commands recorded on the computer-readable medium can be particularly designed and configured for the present generation inventive concept and can be know to and used by computer software makers.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. A method of managing a device driver of a management apparatus which is connectable to at least one image forming apparatus or at least one computer, the method comprising:
    selecting at least one device driver corresponding to the at least one image forming apparatus;
    generating a device driver package comprising the selected at least one device driver, device driver configuration information corresponding to the selected at least one device driver, package configuration information, and at least one of an application and a solution corresponding to the at least one image forming apparatus, at least one of the device driver configuration information and the package configuration information corresponding to the at least one of the application and the solution;
    storing the generated device driver package; and
    deploying the stored device driver package in the at least one computer.

2. The method as claimed in claim 1, wherein the device driver configuration information comprises information about setting of a lock/unlock mode corresponding to at least one function supported by the selected at least one device driver.

3. The method as claimed in claim 1, wherein the device driver package further comprises at least one of an installer to install the device driver in the at least one computer and a file extractor to extract a compressed file of the device driver package.

4. The method as claimed in claim 1, wherein the package configuration information comprises at least one piece of option information set in the device driver package.

5. The method as claimed in claim 4, wherein the at least one piece of option information comprises a determination as to whether a silent mode is applied to the at least one computer when installing the device driver package.

6. The method as claimed in claim 1, wherein the deployment of the stored device driver package comprises at least one of:
    deploying the device driver package in the at least one computer using a remote installation to transmit and to install the device driver package to the at least one computer; and
    deploying the device driver package in the at least one computer using an active directory (AD) deployment to store and to install the device driver package in an AD,
    wherein the device driver package is deployed as at least one of an executable (EXE) file and a Microsoft Installer (MSI) file.

7. The method as claimed in claim 1, further comprising executing a device driver deployment manager in the management apparatus,
    wherein the device driver deployment manager comprises a package module to generate the device driver package, a deployment module to deploy the device driver package, and a driver configuration mode.

8. The method as claimed in claim 1, further comprising providing history information corresponding to the device driver package,
    wherein the history information corresponds to generation or deployment of another stored device driver package.

9. The method as claimed in claim 1, further comprising receiving a log-on corresponding to an administrator account,
    wherein the device driver package is deployed using the administrator account.

10. A method of managing a device driver of a management apparatus which can be connected to at least one image forming apparatus or at least one computer, the method comprising:
    selecting at least one of at least one device driver and a common device driver corresponding to the at least one image forming apparatus;
    displaying a user interface (UI) screen corresponding to at least one function supported by at least one of the at least one device driver and the common device driver and receiving setting of a lock/unlock mode with respect to the at least one function on the displayed UI screen;
    generating a device driver configuration package comprising a device driver modification information execution file to execute a modification of a configuration of an installed device driver using device driver modification information comprising information about the setting of the lock/unlock mode and the device driver modification information, the installed device driver being installed before the device driver configuration package is generated;
    storing the generated device driver configuration package; and
    deploying the stored device driver configuration package in the at least one computer.

11. The method as claimed in claim 10, wherein the device driver configuration package further comprise a file extractor.

12. A management apparatus which can be connected to at least one image forming apparatus or at least one computer, comprising:

a communication interface unit connectable to the at least one image forming apparatus or the at least one computer;

a storage unit to store at least one of at least one device driver or a common device driver corresponding to the at least one image forming apparatus, at least one device driver package, and at least one device driver configuration package;

a device driver deployment manager to select one of the at least one device driver and the common device driver, and to generate and to deploy at least one of the at least one device driver package and the at least one device driver configuration package corresponding to the selected at least one device driver or the selected common device driver, the at least one device driver package including at least one of an application and a solution corresponding to the at least one image forming apparatus, and the at least one device driver configuration package modifying a configuration of an installed device driver installed before the at least one device driver configuration package is generated; and a controller to control the device driver deployment manager to generate at least one of the device driver package and the device driver configuration package, and to deploy at least one of the device driver package and the device driver configuration package through the communication interface unit.

13. The management apparatus as claimed in claim 12, further comprising a display unit to display a first UI screen to set at least one function supported by the selected at least one device driver and a second UI screen to generate at least one of the device driver package and the device driver configuration package.

14. The management apparatus as claimed in claim 12, wherein the device driver package comprises at least one device driver, and device driver configuration information and package configuration information corresponding to the at least one device driver.

15. The management apparatus as claimed in claim 14, wherein the package configuration information comprises at least one piece of option information set in the device driver package.

16. The management apparatus as claimed in claim 12, wherein the device driver configuration package comprises device driver modification information, which comprises information about setting of a lock/unlock mode corresponding to at least one function supported by at least one of the device driver and the common device driver, and a device driver modification information execution file to execute a modification of a configuration of an installed device driver using the device driver modification information.

17. The management apparatus as claimed in claim 12, wherein the device driver deployment manager selects at least one of an executable (EXE) file and a Microsoft Installer (MSI) file in which the device driver package or the device driver configuration package is deployed.

18. The management apparatus as claimed in claim 12, wherein the device driver deployment manager supports an edition function with respect to the device driver package or the device driver configuration package stored in the storage unit.

19. The management apparatus as claimed in claim 12, wherein the device driver deployment manager selects at least one computer in which at least one of the device driver package and the device driver configuration package stored in the storage unit is deployed.

20. A device driver deployment manager disposed within a management apparatus, the device driver deployment manager comprising:

a device driver selection module to receive a selection of a device driver and to receive a selection of at least one of an application and a solution;

a device driver information extracting module to extract device driver data corresponding to the device driver;

a package generation module to generate a device driver package that includes a device driver configuration, a package configuration corresponding to the device driver data, and the at least one of the application and the solution, the device driver configuration and the package configuration corresponding to the at least one of the application and the solution; and a deployment module to deploy the generated device driver package in a device.

21. The device driver deployment manager of claim 20, wherein the device driver selection module is further configured to receive a selection of another stored device driver package or another stored device driver configuration package.

22. The device driver deployment manager of claim 20, wherein the device driver information extracting module determines whether the selected device driver is a device driver capable of setting a lock/unlock mode with respect to a function supported by the device driver.

23. The device driver deployment manager of claim 20, wherein the package generation module comprises:

a package configuration input module to set the device driver configuration of the device driver using the extracted device driver data;

a package configuration information generation module to generate package configuration information based on the configuration of the device driver;

a file compression module to generate a compression package by compressing the device driver configuration information, the package configuration information and the device driver; and a package file generation module to generate a device driver package file based on the compression package and a file extension for the device driver package file.

24. The device driver deployment manager of claim 23, wherein the file compression module further compresses an installer that installs the device driver and a file extractor that extracts the device driver to be included in the compression package.

25. The device driver deployment manager of claim 23, wherein the deployment module is configured to deploy the device driver package as an executable (EXE) file if the file extension is EXE and as a Microsoft Installer (MSI) file if the file extension is MSI.

26. The device driver deployment manager of claim 23, wherein the package configuration input module is further configured to cause the device driver to determine whether the device driver configuration has been modified, and to reconfigure the device driver configuration of the device driver if the device driver configuration has been modified.

27. The device driver deployment manager of claim 23, wherein the package configuration information generation module is further configured to determine whether the package configuration has been modified, and to reconfigure the package configuration of the device driver if the package configuration has been modified.

28. The device driver deployment manager of claim 20, wherein the device driver configuration package comprises device driver modification information to modify configuration of the device driver and a device driver modification information execution file to execute the device driver modification information.

29. The device driver deployment manager of claim 20, wherein the device driver data comprises a device driver installation file, a type and a name of the device driver, a type and a file name of a file configuring the device driver, information on a manufacturing company providing the device driver, information of an image forming apparatus supported by the device driver, or a combination thereof.

* * * * *